US012671589B1

(12) United States Patent
Lee

(10) Patent No.: US 12,671,589 B1
(45) Date of Patent: Jun. 30, 2026

(54) SYSTEMS AND METHODS FOR FAIL-CLOSED PERMIT-BEFORE-ACTUATE GATING WITH POLICY-PACK-BOUND EVALUATION, COALITION OVERLAY COMPLIANCE, AND CONTINUITY-VERIFIED PROOF-OF-POLICY-COMPLIANCE RECEIPTS FOR HIGH-STAKES EFFECTOR SYSTEMS (EFFECTOR TRUTH RAIL)

(71) Applicant: Yong Bok Lee, Sheridan, WY (US)

(72) Inventor: Yong Bok Lee, Sheridan, WY (US)

(73) Assignee: The Lamb within the Lion LLC, Sheridan, WY (US)

( * ) Notice: Subject to any disclaimer, the term of this patent is extended or adjusted under 35 U.S.C. 154(b) by 0 days.

(21) Appl. No.: 19/460,855

(22) Filed: Jan. 27, 2026

(51) Int. Cl.
*H04L 29/06* (2006.01)
*H04L 9/32* (2006.01)

(52) U.S. Cl.
CPC ................................. *H04L 9/3218* (2013.01)

(58) Field of Classification Search
CPC ....... H04L 9/3218; H04L 63/20; H04L 63/10; H04L 63/108; H04L 63/08; H04L 63/105; H04L 63/0263; H04L 67/63; G06F 21/62; G06F 21/6218; G06F 21/57; G06F 21/604; H04W 12/08
See application file for complete search history.

(56) References Cited

U.S. PATENT DOCUMENTS

| | | | |
|---|---|---|---|
| 8,719,576 B2 | 5/2014 | Buldas et al. | |
| 8,875,266 B2 | 10/2014 | Chambers et al. | |
| 9,118,467 B2 | 8/2015 | Maletsky et al. | |
| 9,363,241 B2 | 6/2016 | Deutsch et al. | |
| 9,405,912 B2 | 8/2016 | Novak et al. | |
| 10,489,156 B2 | 11/2019 | Munoz et al. | |

(Continued)

OTHER PUBLICATIONS

Newman et al., "Sigstore: Software Signing for Everybody," ACM CCS, 2022, DOI:10.1145/3548606.3560596.

(Continued)

*Primary Examiner* — Yogesh Paliwal

(57) ABSTRACT

Systems and methods provide fail-closed permit-before-actuate control for high-stakes effectors. A permit engine receives an operation request, canonicalizes operation context to a context digest, and, in an attested execution environment, evaluates a versioned policy pack, optionally with overlays, against the digest and commitments to evidence bundles under freshness thresholds. Upon compliance, a proof-of-policy-compliance receipt is produced, a minimal receipt core is derived, and a receipt commitment is generated. The commitment is anchored in an append-only continuity-verified log publishing signed heads with inclusion and consistency proofs subject to a maximum-merge-delay policy. A mint-after-verify process issues a scoped permit token only after verifying log proofs; the token is bound to the receipt commitment and a token scope and includes anti-replay and validity constraints. An actuation gate denies by default and enables actuation only after time-of-use validation of scope, revocation status, and proof freshness, and outputs precondition failure records with deterministic reason codes.

30 Claims, 14 Drawing Sheets

(56) References Cited

U.S. PATENT DOCUMENTS

| 10,581,613 | B2 | 3/2020 | Ford et al. | |
| 10,628,389 | B2 | 4/2020 | Bordens | |
| 11,108,559 | B2 | 8/2021 | Resch et al. | |
| 12,058,265 | B2 | 8/2024 | Khoury et al. | |
| 12,519,840 | B1* | 1/2026 | Abotchie | H04L 63/20 |
| 2013/0055396 | A1 | 2/2013 | Wang et al. | |
| 2015/0084741 | A1 | 3/2015 | Bergdale et al. | |
| 2015/0172054 | A1 | 6/2015 | Prakash et al. | |
| 2018/0176210 | A1* | 6/2018 | Comay | H04W 12/069 |
| 2019/0188712 | A1* | 6/2019 | Fedorov | G06F 21/53 |
| 2020/0153631 | A1 | 5/2020 | Carey et al. | |
| 2020/0259663 | A1 | 8/2020 | Firsov | |
| 2020/0344074 | A1 | 10/2020 | Främling et al. | |
| 2022/0207005 | A1* | 6/2022 | Chenthamarakshan | G06F 16/22 |
| 2023/0164143 | A1 | 5/2023 | Richardson, IV et al. | |
| 2023/0401332 | A1* | 12/2023 | Vahidnia | G06F 21/6218 |
| 2024/0241960 | A1 | 7/2024 | King et al. | |
| 2025/0141870 | A1 | 5/2025 | Cohen | |
| 2025/0259043 | A1* | 8/2025 | Crabtree | G06N 3/047 |
| 2025/0293884 | A1* | 9/2025 | Gilchrist | H04L 9/3213 |
| 2025/0307036 | A1* | 10/2025 | Chan | G06F 16/27 |
| 2025/0335458 | A1* | 10/2025 | Lewis | G06F 16/252 |
| 2025/0384072 | A1* | 12/2025 | Bhat | G06F 9/5011 |
| 2026/0066922 | A1* | 3/2026 | Cooper | G06N 20/00 |
| 2026/0073407 | A1* | 3/2026 | Peters | G06Q 30/018 |

OTHER PUBLICATIONS

Birkholz et al., "SCITT Architecture," IETF Internet-Draft draft-ietf-scitt-architecture-22, 2025.

Steele et al., "COSE Receipts," IETF Internet-Draft draft-ietf-cose-merkle-tree-proofs-18, 2025.

Haber & Stornetta, "How to Time-Stamp a Digital Document," CRYPTO '90 (LNCS 537), 1991.

Merkle, "A Digital Signature Based on a Conventional Encryption Function," CRYPTO '87 (LNCS 293), 1988.

Laurie et al., "Certificate Transparency," RFC 6962, 2013.

Laurie et al., "Certificate Transparency Version 2.0," RFC 9162, 2021.

Rundgren et al., "JSON Canonicalization Scheme (JCS)," RFC 8785, 2020.

Jones et al., "JSON Web Signature (JWS)," RFC 7515, 2015.

Bormann & Hoffman, "CBOR," RFC 8949, 2020.

Schaad, "COSE: Structures and Process," RFC 9052, 2022.

Samuel et al., "Survivable Key Compromise in Software Update Systems," ACM CCS, 2010.

Torres-Arias et al., "in-toto: Providing farm-to-table guarantees for bits and bytes," USENIX Security, 2019.

* cited by examiner

POLICY PACK 132 (LAYERED)

FIG. 4

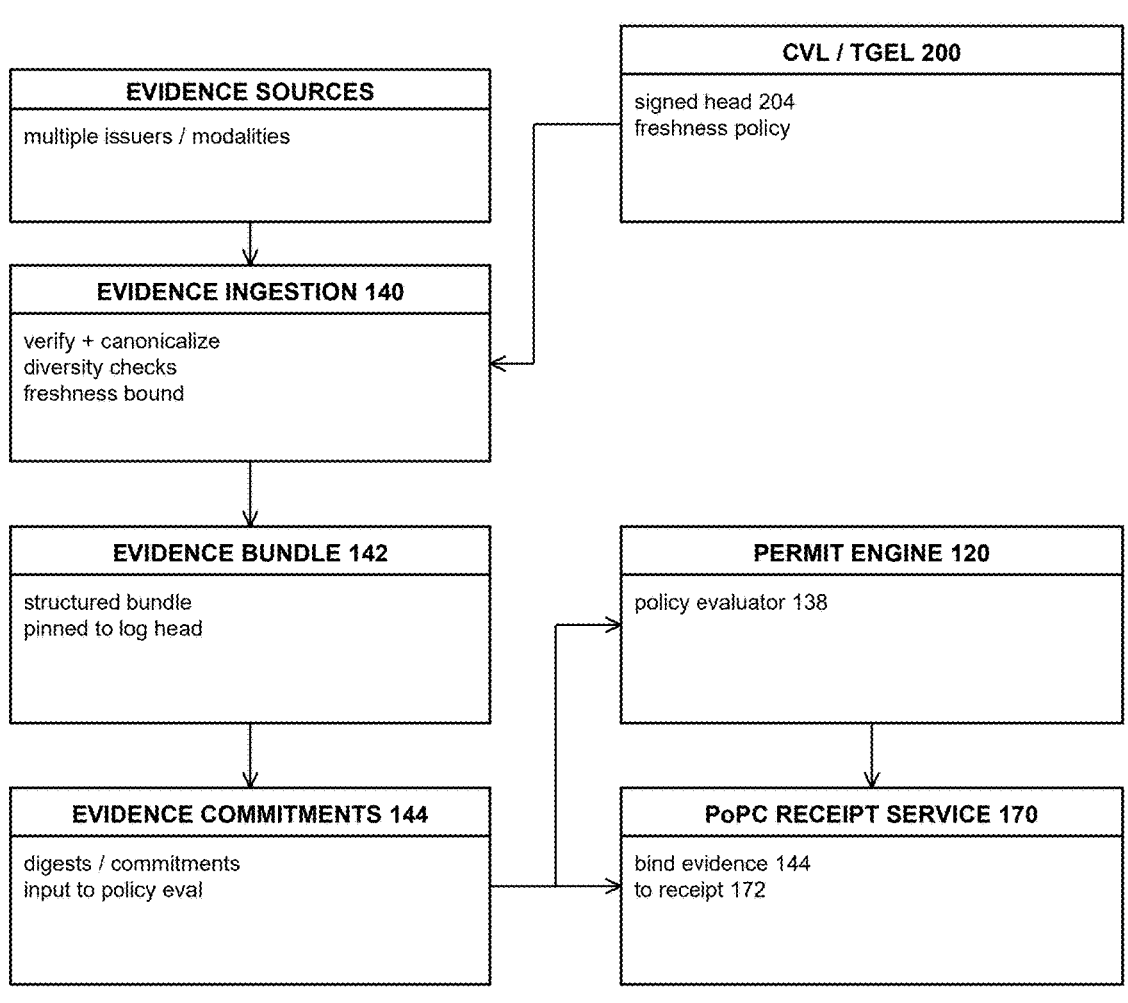

EVIDENCE SOURCES multiple issuers / modalities

CVL / TGEL 200 signed head 204
freshness policy

EVIDENCE INGESTION 140 verify + canonicalize
diversity checks
freshness bound

EVIDENCE BUNDLE 142 structured bundle
pinned to log head

PERMIT ENGINE 120 policy evaluator 138

EVIDENCE COMMITMENTS 144 digests / commitments
input to policy eval

PoPC RECEIPT SERVICE 170 bind evidence 144
to receipt 172

| RECEIPT COMMITMENT 175 |
| --- |
| from PoPC receipt 172 |

| PERMIT TOKEN ISSUER 180 |
| --- |
| mint-after-verify<br>check freshness + revocation |

| REVOCATION EVENTS 188 |
| --- |
| revocations / rotations |

| LOG PROOFS |
| --- |
| signed head 204<br>inclusion 206<br>consistency 208 |

| REVOCATION GRAPH 189 |
| --- |
| propagation index |

| SCOPED PERMIT TOKEN 182 |
| --- |
| token scope 184<br>anti-replay tuple 187 |

| ACTUATION GATE 190 |
| --- |
| accept / reject token<br>fail-closed |

FIG. 11

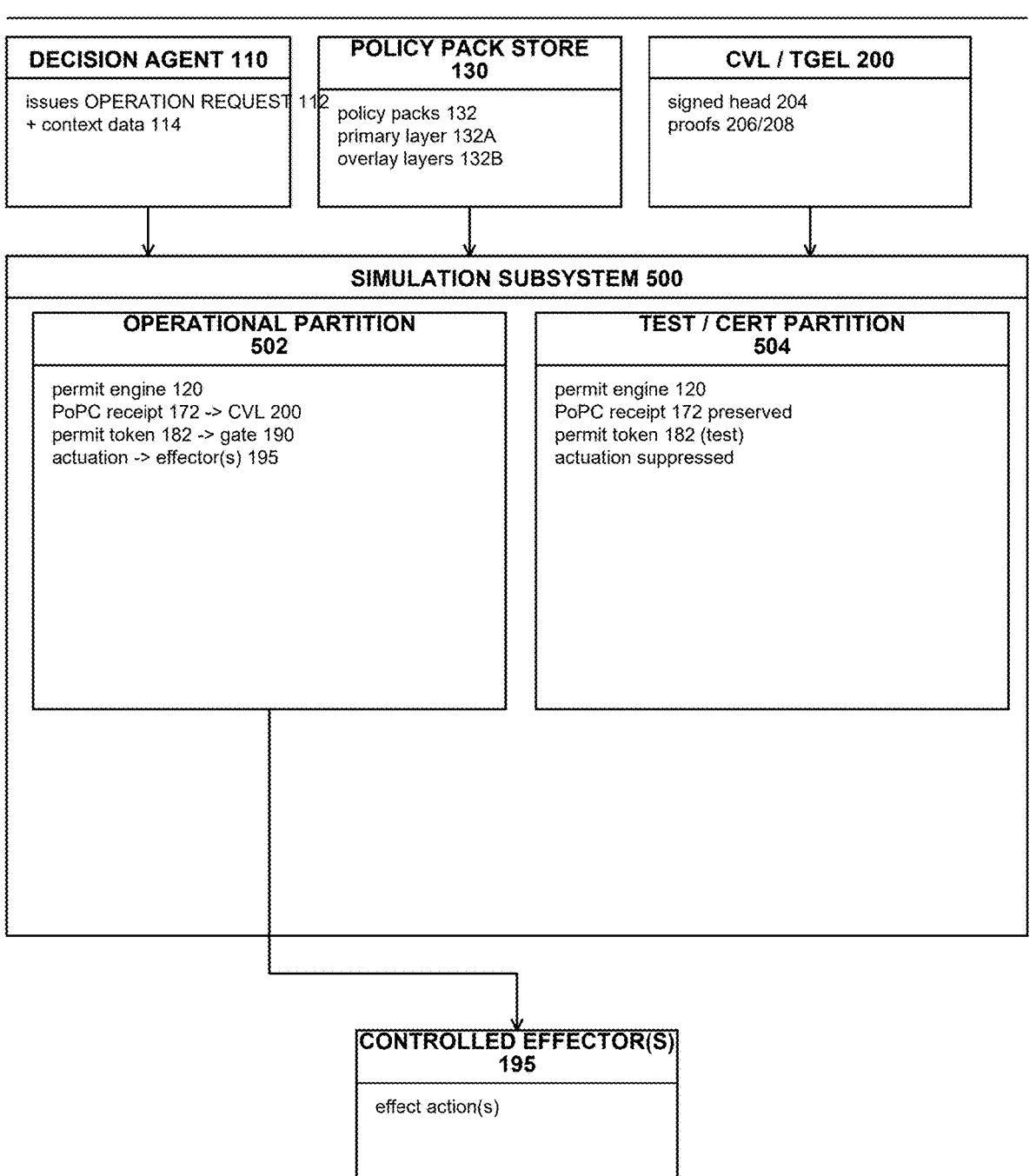

DECISION AGENT 110 issues OPERATION REQUEST 112
+ context data 114

POLICY PACK STORE 130 policy packs 132
primary layer 132A
overlay layers 132B

CVL / TGEL 200 signed head 204
proofs 206/208

SIMULATION SUBSYSTEM 500

OPERATIONAL PARTITION 502 permit engine 120
PoPC receipt 172 -> CVL 200
permit token 182 -> gate 190
actuation -> effector(s) 195

TEST / CERT PARTITION 504 permit engine 120
PoPC receipt 172 preserved
permit token 182 (test)
actuation suppressed

CONTROLLED EFFECTOR(S) 195 effect action(s)

SYSTEMS AND METHODS FOR FAIL-CLOSED PERMIT-BEFORE-ACTUATE GATING WITH POLICY-PACK-BOUND EVALUATION, COALITION OVERLAY COMPLIANCE, AND CONTINUITY-VERIFIED PROOF-OF-POLICY-COMPLIANCE RECEIPTS FOR HIGH-STAKES EFFECTOR SYSTEMS (EFFECTOR TRUTH RAIL)

Non-trademark and terminology notice (illustrative; non-limiting). "EFFECTOR TRUTH RAIL," "Permit-Before-Actuate (PBA)," "Proof-of-Policy-Compliance (PoPC)," "ReceiptCore," "Minimal ReceiptCore," "receipt commitment," "Continuity-Verified Log (CVL)," "Tribunal-Grade Evidence Log (TGEL)," "Signed Head (SH)," "inclusion proof," "consistency proof," "maximum merge delay (MMD)," "Mint-After-Verify (MAV)," "actuation gate," "Structured Precondition Failure (SP-F)," and other acronyms used herein are labels for clarity only and carry no trademark significance. The scope of protection is defined solely by the claims. The embodiments disclosed herein are illustrative and non-limiting unless expressly stated otherwise. Appendix A provides an illustrative, non-limiting glossary of certain terms. In the event of any inconsistency between a glossary entry and the claims, the claims control.

CROSS-REFERENCE TO RELATED APPLICATIONS

Cross-reference to related applications; no priority claim (illustrative; non-limiting). This application is filed as an original non-provisional application under 35 U.S.C. § 111 (a) and does not claim the benefit of, or priority to, any earlier-filed application, including any provisional application under 35 U.S.C. § 119 (e).

Incorporation by reference (illustrative; non-limiting). Any document incorporated by reference is incorporated only to the extent not inconsistent with the present disclosure. In the event of any inconsistency, the present disclosure controls. Incorporation by reference is not an admission that any incorporated material is prior art.

FIELD

The present disclosure relates generally to governance, safety, compliance, and accountability enforcement for controlled systems, and more particularly to fail-closed permit-before-actuate gating and policy-pack-bound evaluation with replay-verifiable proof artifacts for high-stakes effector systems, including physical effectors and informational effectors, across distributed and multi-stakeholder environments. In some embodiments, deployment domains may include, without limitation, agentic AI orchestration platforms, autonomous vehicles and mobility systems, robotic surgery and clinical robotics platforms, industrial control and critical-infrastructure systems, financial and settlement systems, cloud and enterprise automation platforms, and defense or public-safety systems. In some embodiments, the disclosed architectures are intended to function as domain-neutral, cross-layer safety and accountability rails that remain applicable as new effector modalities, agentic AI patterns, and high-stakes automation workflows emerge over time.

BACKGROUND

Controlled systems increasingly execute actions that can cause high-stakes effects. Such actions may include physical actuation (e.g., device control; robotics actions such as autonomous vehicle maneuvers, drone or uncrewed system operations, and robotic surgery actions; industrial control actions in critical-infrastructure facilities; access control actions; and other safety-critical device operations) and informational actuation (e.g., account actions, transaction dispatch, message dissemination, content publication, network actions, agentic AI orchestration of downstream services and workflows, and other actions that materially affect people, assets, safety, or outcomes).

In some embodiments, high-stakes informational actuation includes finalizing, committing, rendering, or otherwise operationalizing a decision-support output, and/or performing a controlled record write-back operation in a controlled record system (e.g., updating a record, triggering downstream automation, publishing a determination, or causing an effect-equivalent state transition). Such informational actuation may be safety-critical or materially consequential and is therefore treated as actuation for purposes of fail-closed permit-before-actuate gating. This example is illustrative and non-limiting.

In many deployments, decision logic and control logic are distributed across heterogeneous components, suppliers, and administrative boundaries, including evolving policy configurations and evidence pipelines. Such systems may incorporate machine-learned models, heuristics, and rule engines and may evolve over time, making it difficult to prove after the fact which policy (and policy version) applied, which evidence was considered, whether required approvals were obtained, whether freshness bounds were satisfied, and whether actuation complied with applicable constraints.

Conventional telemetry and logging can record events and measurements, but often fails to provide replay-verifiable, machine-checkable proof of policy application and preconditions at the time of decision. Logs may be incomplete, susceptible to tampering or selective omission, and insufficiently structured to support independent verification of policy identity and versioning, canonicalized inputs, committed evidence, and bounded freshness conditions.

Further, many systems permit "best-effort" actuation when policy checks are slow, unavailable, deferred, or ambiguous (e.g., degraded modes, asynchronous verification, cache staleness, exception paths, or grace windows). Such behavior can defeat a fail-closed safety requirement under which, absent a valid permit and timely proof satisfaction, the default behavior is non-actuation. In addition, systems that verify conditions at check time may remain vulnerable to time-of-check-to-time-of-use (TOCTOU) failures in which conditions change prior to actuation.

In some embodiments, high-stakes effector systems are targeted by adversarial manipulation attempts, including synthetic media and impersonation (e.g., deepfakes), compromised or spoofed sensor feeds, coerced or socially engineered approvals, and tool or workflow hijacking in agentic orchestration pipelines. Such attempts can cause unauthorized physical or informational actuation when downstream systems treat untrusted, stale, or manipulated inputs as authoritative.

In some embodiments, additional risks include prompt- or instruction-injection that causes an automated decision agent to invoke privileged tools or APIs, credential theft or key compromise that enables unauthorized permit issuance, replay or reuse of previously valid approvals or artifacts outside an intended scope, and partial or split-brain finalization across retries. In distributed deployments, inconsistent views of policy versions, evidence freshness, revocation state, and log state can amplify these risks.

Accordingly, in some embodiments, technical safety is improved by fail-closed architectures that prevent high-stakes actuation unless verifiable, freshness-bounded proof artifacts indicate that applicable policy predicates were satisfied at decision time and are revalidated at time-of-use, without limitation.

High-stakes operations may also require multi-stakeholder governance. For example, coalition partners, regulators, auditors, safety boards, procurement authorities, or other oversight entities may require proof that layered policy constraints were satisfied before an action occurred, and may require evidence suitable for later audit, dispute resolution, or enforcement.

Policy may be complex and contextual, including layered rule sets such as organizational policy, mission policy, safety policy, regulatory requirements, contractual constraints, alliance constraints, and legal obligations. In many cases, effective policy is an intersection (or other composition) of layers with defined composition semantics, potentially spanning multiple stakeholders and administrative domains.

There is therefore a need for domain-neutral architectures that can, alone or in combination depending on deployment requirements: (i) prevent actuation by default and enable actuation only upon presentation of a cryptographically verifiable permit; (ii) bind each permit to a versioned policy pack and committed evidence evaluated under one or more freshness bounds; (iii) support multi-stakeholder overlay constraints with defined composition semantics; and (iv) emit replay-verifiable receipts and proof artifacts anchored in an append-only continuity-verified log enabling independent verification and recomputation by external verifiers, including at time-of-use where applicable. In some embodiments, such architectures are applicable across heterogeneous high-stakes environments, including agentic AI platforms, autonomous and semi-autonomous systems, robotic and industrial control systems, financial and settlement systems, healthcare and clinical decision-support systems, cloud and enterprise automation platforms, and defense or public-safety systems, as well as future high-stakes effector systems not yet known at the time of filing.

SUMMARY

The embodiments described herein provide systems and methods for fail-closed permit-before-actuate gating, policy-pack-bound evaluation, coalition overlay compliance, and replay-verifiable proof-of-policy-compliance receipts for high-stakes effector systems (collectively, the "Effector Truth Rail"). In some embodiments, actuation privilege is conditioned on (i) successful verification of a receipt commitment anchored in a continuity-verified log and (ii) issuance of a scoped permit token minted only after such verification, thereby supporting fail-closed permit-before-actuate gating.

In some embodiments, the Effector Truth Rail provides an integrity binding chain in which (i) canonicalized operation context, (ii) committed evidence and freshness metadata, (iii) a versioned policy pack and any overlay constraints, and (iv) attested execution measurements are bound into a receipt, a receipt commitment, and one or more proof artifacts, and in which actuation is enabled only when a minted permit token is cryptographically bound to the receipt commitment and validated at time-of-use under freshness, revocation, and anti-replay constraints.

In some embodiments, the Effector Truth Rail enforces idempotent and atomic finalization of actuation across retries by requiring an idempotency mechanism comprising at least one of: an idempotency key, a transaction fence, a compare-and-swap-based commit marker, a write-ahead-log barrier, or a functionally equivalent control mechanism that prevents duplicate, partial, or split-brain finalizations for a same operation request. In some embodiments, the idempotency mechanism is cryptographically bound to at least one of a receipt commitment, a token identifier, or an anti-replay tuple, and violations map to fail-closed denial and emission of a Structured Precondition Failure (SP-F) record.

In some embodiments, a permit engine receives an operation request associated with a controlled effector. The operation request includes operation context data, which may include operation class, effect type, risk classification, bounded regions, time windows, target/resource identifiers, and other metadata.

In some embodiments, the permit engine selects a versioned policy pack comprising machine-enforceable policy predicates. In some embodiments, the policy pack includes a primary layer and one or more overlay layers supplied by distinct stakeholders, such that compliance requires satisfaction of multiple layers under specified composition semantics.

In some embodiments, the permit engine obtains one or more evidence bundles referenced by the operation request. Evidence bundles may include sensor observations, audit artifacts, provenance records, approval records, prior receipts, or other data required by policy predicates. In some embodiments, evidence bundles are committed by cryptographic digests and associated with freshness metadata and diversity constraints.

In some embodiments, the permit engine evaluates policy predicates within an attested execution environment (AEE) under freshness bounds. The AEE may produce an attestation report binding evaluation to measurements of the trusted compute boundary, the policy pack digest/version, and digests of canonicalized inputs.

In response to a compliant outcome, the system generates a proof-of-policy-compliance (PoPC) receipt. In some embodiments, the PoPC receipt encodes at least: a policy pack identifier/version, cryptographic commitments to evidence bundles, an evaluation outcome, an accountable principal field, and validity constraints. In some embodiments, the PoPC receipt includes deterministic reason codes and evidence references.

In some embodiments, a receipt commitment derived from a Minimal ReceiptCore is anchored into a Continuity-Verified Log (CVL) configured as an append-only, continuity-verified structure publishing signed heads (SH) and providing inclusion proofs and consistency proofs.

In some embodiments, under a maximum merge delay (MMD) freshness policy, the system verifies inclusion of the receipt commitment under a sufficiently fresh signed head and, upon relying on a newer signed head than a previously observed signed head, verifies append-only evolution via a consistency proof and updates a continuity record.

In some embodiments, a Mint-After-Verify (MAV) process issues a scoped permit token only after verification succeeds. In some embodiments, the scoped permit token is cryptographically bound to the receipt commitment and to a token scope describing an allowed actuation envelope and includes anti-replay and validity constraints.

In some embodiments, an actuation gate enforces fail-closed gating such that actuation is prevented unless token validity, scope constraints, revocation status, and freshness conditions are satisfied at time-of-use (TOCTOU mitigation). In some embodiments, the actuation gate outputs a Structured Precondition Failure (SP-F) record with deterministic reason codes upon any failure.

In some embodiments, the system supports independent verification by assembling a tribunal packet comprising receipts and proof artifacts (e.g., signed head identifiers, inclusion proofs, consistency proof references, attestation references) enabling replay verification and independent recomputation by external verifiers, with optional selective disclosure and redaction mappings.

BRIEF DESCRIPTION OF THE DRAWINGS

FIG. 4 depicts evidence bundle graphs including provenance links, diversity requirements, and staleness intervals.

FIG. 11 depicts simulation, training, testing, and certification modes including a simulation subsystem, partitioned CVL/TGEL logs, and suppression of actuation while preserving receipt generation and anchoring.

DETAILED DESCRIPTION OF EMBODIMENTS

A. Overview of Example Environment (FIG. 1)

Figure 1:
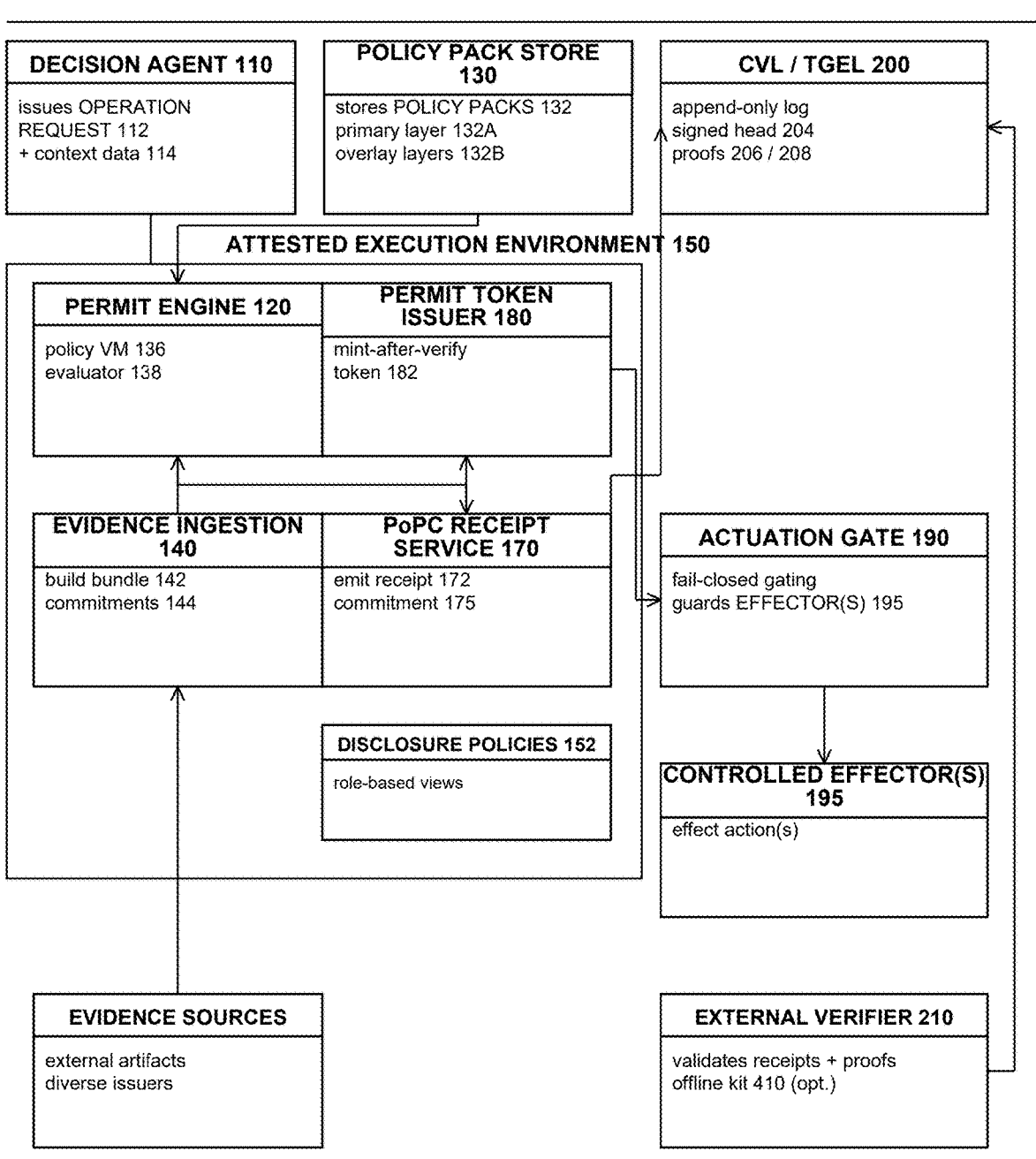
FIG. 1 depicts an example operating environment including a decision agent, a permit engine, a policy pack store, an evidence ingestion service, an attested execution environment, a receipt service, a CVL/TGEL, an actuation gate, one or more controlled effectors, and one or more external verifiers.

FIG. 1 illustrates an example environment 100 for the Effector Truth Rail. Like reference numerals denote like elements throughout the disclosure. The environment 100 may include a decision agent 110, a permit engine 120, a policy pack store 130, an evidence ingestion service 140, an attested execution environment (AEE) 150, a receipt service 170, a CVL/TGEL 200, an actuation gate 190, one or more controlled effectors 195, and one or more external verifiers 210.

The decision agent 110 may be software, hardware, or a hybrid component that proposes operation requests 112. The decision agent 110 may operate under human control, semi-autonomous control, or autonomous control, subject to governance constraints.

The permit engine 120 is configured to evaluate whether an operation request 112 is permissible under one or more policy packs 132 and evidence constraints derived from one or more evidence bundles 142, and to cause actuation gating to remain fail-closed absent a verified permit.

The actuation gate 190 enforces fail-closed control over the controlled effector(s) 195 by requiring a scoped permit token 182 and verified anchoring of a receipt commitment 175 in the CVL/TGEL 200 prior to enabling actuation.

B. Controlled Effectors, Actuation, and High-Stakes Operations

A controlled effector 195 or controlled actuator may include any component capable of producing an actuation, including physical effectors and informational effectors. A controlled effector may be a device, a software service, an account, a network function, a publication channel, or another effect-producing component, including, without limitation, actuators in autonomous vehicles and mobility platforms, robotic surgery and clinical robotics systems, industrial control systems managing critical infrastructure, safety-critical medical or life-support devices, defense or public-safety systems, and agentic AI platforms that can directly issue commands to such effectors or to functionally equivalent actuation surfaces.

Actuation may include enabling an actuator, initiating a control sequence, transmitting privileged commands, enabling access, committing transactions, dispatching messages, publishing content, or otherwise causing an effect.

In some embodiments, informational actuation includes finalizing, committing, publishing, transmitting, or otherwise operationalizing a decision-support interface (DSI) output, committing a determination to a downstream system, and/or performing a controlled record write-back in a controlled record system, where such finalization, commitment, publication, transmission, or write-back constitutes an actuation surface and is prevented by default and enabled only when permit verification conditions are satisfied under fail-closed semantics. This embodiment is illustrative and non-limiting and may apply across domains, without limitation, including healthcare, finance, critical infrastructure, enterprise automation, agentic AI orchestration platforms, autonomous and semi-autonomous systems (including autonomous vehicles, robotic surgery systems, and uncrewed systems), and defense or public-safety systems.

In some embodiments, informational actuation further includes one or more pre-effect admission actions that make downstream work executable or materially consequential, including without limitation compute-admission actions (e.g., enqueue, job admission, kernel launch, DMA enablement, memory-mapping enablement, mediated-device enablement, virtual-function enablement, scheduler admission, quota/budget admission, or functionally equivalent enablement actions), privileged tool or API invocations (e.g., by a human, software, and/or an agentic system), and controlled data-release or disclosure actions. In some embodiments, such actions are prevented by default and are enabled only when permit verification conditions (including time-of-use proof freshness) are satisfied under fail-closed semantics.

In some embodiments, an operation request 112 is classified as high-stakes based on operation class, risk classification, effect magnitude, affected parties, jurisdictional constraints, or other factors.

C. Operation Requests, Context Canonicalization, and Commitments

In some embodiments, the decision agent 110 generates operation requests 112. Each operation request 112 may include or reference operation context data 114 comprising, by way of example: operation class, effect type, risk classification, bounded region identifiers, time window constraints, target/resource identifiers or classes, and required evidence constraints.

In some embodiments, the permit engine 120 deterministically canonicalizes at least a portion of operation context data 114 to produce a canonical context digest 116. Canonicalization may use deterministic serialization rules to avoid ambiguity and enable reproducible hashing and verification. In some embodiments, canonicalization is performed under a context label 118 (e.g., a versioned domain-separation label) that is included in, or committed by, the canonicalized representation, such that any mismatch between an expected context label and a committed context label maps to fail-closed denial and an SP-F record 300.

In some embodiments, canonicalization further comprises generating an explicit inclusion manifest identifying which context fields and metadata fields were included in the canonicalized representation, and computing a context_field_list_digest over a deterministic canonical encoding of the inclusion manifest. In some embodiments, the system provides a verification interface configured, given one or more upstream system logs for the operation request 112, to recompute the inclusion manifest and the context_field_list_digest using the deterministic canonicalization rules and to confirm that evaluation, receipt issuance, and/or permit issuance corresponded to the canonicalized context as represented by the context_field_list_digest. This embodiment is illustrative and non-limiting.

In some embodiments, evidence bundles 142 referenced by an operation request 112 are committed by cryptographic digests (evidence commitments 144) and associated with freshness metadata commitments 146. In some embodiments, commitment schemes include Merkle roots, hash chains, or other commitment mechanisms.

Figure 2:
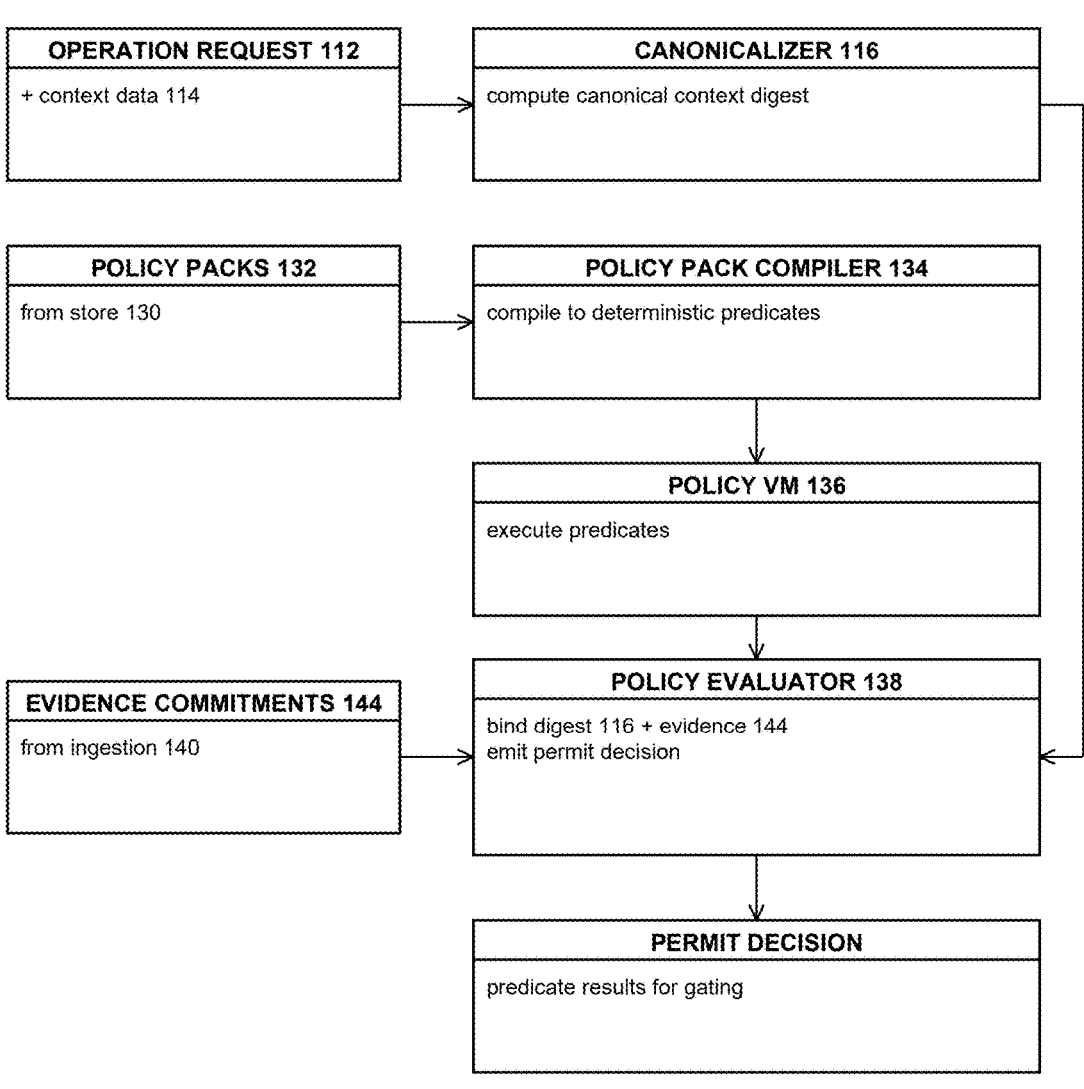
FIG. 2 depicts policy pack compilation and deterministic execution of a policy virtual machine subject to one or more freshness bounds.
Figure 3:
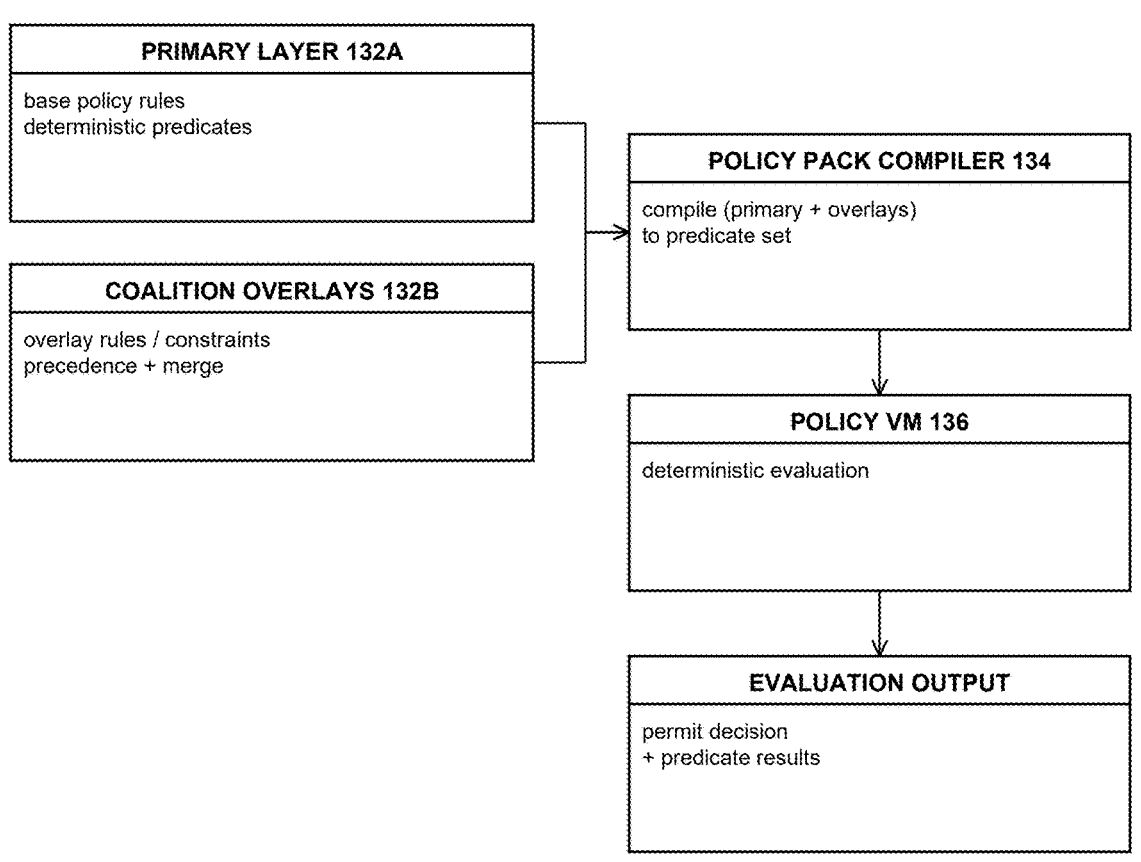
FIG. 3 depicts composition of coalition overlays and evaluation of multi-party approval predicates.

D. Policy Packs, Overlay Layers, and Deterministic Evaluation (FIGS. 2-3)

In some embodiments, the policy pack store 130 stores versioned policy packs 132. A policy pack 132 may include a policy pack identifier, a version tag, and optionally a cryptographic digest and signature attesting provenance and approval status.

In some embodiments, a policy pack 132 includes multiple policy modules such as safety constraints, authorization constraints, regulatory constraints, contractual constraints, operational constraints, and legal obligations, without limitation.

In some embodiments, a policy pack 132 includes a primary policy layer 132A managed by an operating entity and one or more overlay policy layers 132B managed by distinct stakeholders. Overlay layers may be composed using AND semantics or other specified semantics. Composition semantics may include conjunction, disjunction, precedence or override rules, threshold rules, lattice-based constraints, or conflict-resolution policies, and may be parameterized by operation class or risk classification.

In some embodiments, a policy pack 132 is compiled by a policy pack compiler 134 into deterministic predicates executed by a policy virtual machine (policy VM) 136. The policy VM 136 may produce deterministic outcomes and deterministic reason codes, and may produce a deterministic evaluation trace 138.

In some embodiments, the system requires explicit approvals for high-risk operations, including k-of-m approvals from authorized principals, and binds approval commitments into receipts and/or permit issuance conditions.

In some embodiments, the policy pack store 130 and/or policy pack compiler 134 is coupled to a policy governance service 700 that produces distribution artifacts enabling independent parties to verify that a policy pack 132 used for evaluation corresponds to an approved, versioned, and reproducible policy pack.

In some embodiments, the policy governance service 700 generates a signed policy manifest 712 comprising at least: a policy pack identifier, a policy pack version, a policy digest for the policy pack 132, a canonicalization identifier (e.g., context label 118 or domain-separation label), and a compiler or policy VM measurement digest derived from at least one of attestation evidence or signed build provenance for the policy pack compiler 134 and/or policy VM 136.

In some embodiments, a manifest commitment 714 is derived from a canonical encoding of the signed policy manifest 712 and is anchored in the CVL/TGEL 200 by obtaining a signed head 204 and an inclusion proof 206 for the manifest commitment 714 under the signed head 204, optionally with consistency proof verification 208 and continuity record update 216 upon signed-head advancement.

In some embodiments, the policy governance service 700 generates a conformance pack 716 comprising deterministic test vectors and expected outcomes for execution of deterministic policy predicates under the canonicalization identifier, and optionally comprising expected evaluation trace commitments.

In some embodiments, a relying party, permit engine 120, or policy admission controller 720 performs pre-use admission of a policy pack 132 by verifying inclusion of the manifest commitment 714 under a sufficiently fresh signed head 204 (e.g., under an MMD freshness policy) and executing at least a portion of the conformance pack 716 in the policy VM 136 to compare observed outcomes to expected outcomes, thereby admitting the policy pack 132 for use only upon successful verification and conformance.

In some embodiments, admission failure causes fail-closed denial of policy pack use and output of a machine-verifiable failure record (including an SP-F record 300) with deterministic reason codes and evidence references, and, in some embodiments, a failure commitment derived therefrom is anchored in the CVL/TGEL 200.

In some embodiments, the permit engine 120 references, in PoPC receipts 172 and/or SP-F records 300, one or more manifest evidence references sufficient for an independent verifier to validate that the policy digest corresponds to a signed policy manifest 712 anchored in the CVL/TGEL 200. In some embodiments, policy revocation events for policy pack identifiers and versions are anchored in the CVL/TGEL 200 and distributed to relying party caches, and a key-status record for a policy authority signing key is published and optionally anchored for verifier consumption.

In some embodiments, policy predicates govern privileged tool or API invocations by requiring step-up approvals, quorum approvals, scoped token envelopes, bounded time windows, rate limits, concurrency limits, and/or budget constraints for high-stakes operations, without limitation. In some embodiments, attempts to invoke tools outside an allowed envelope map to fail-closed denial and emission of a Structured Precondition Failure (SP-F) record with deterministic reason codes and evidence references.

In some embodiments, the policy pack is treated as a governed artifact, and policy admission includes verification of policy identity and version, applicable overlays, and (when used) conformance vectors, so that a compromised, unadmitted, or mismatched policy pack is not used to authorize high-stakes actuation without detection, without limitation.

E. Evidence Bundles, Diversity Requirements, and Freshness Bounds (FIG. 4)

In some embodiments, the evidence ingestion service 140 obtains evidence bundles 142 referenced by operation requests 112. Evidence bundles 142 may include sensor observations, provenance records, audit trails, external attestations, approval records, prior receipts, and other evidence items.

In some embodiments, evidence diversity thresholds are enforced. For example, a policy predicate may require at least two independent modalities or sources, or require corroboration of a classification result by independent sources.

In some embodiments, freshness bounds are enforced. Evidence items and bundles may be associated with capture timestamps and staleness intervals, and the policy VM 136 may output HOLD or DENY when evidence is stale, missing, or insufficient.

In some embodiments, policy predicates include authenticity and/or provenance requirements for evidence bundles, including without limitation attested capture metadata, secure capture claims, provenance records, content-authenticity credentials, watermark credentials, and/or other authenticity signals, and/or multi-source corroboration requirements. No specific deepfake-detection algorithm is required; rather, the policy pack may incorporate any detection, provenance, or corroboration mechanism, and the permit engine outputs HOLD or DENY when required authenticity, diversity, or freshness conditions are not satisfied.

In some embodiments, evidence freshness evaluation includes staleness intervals, bounded capture windows, and/or confidence indicators, and freshness failures map to HOLD or DENY under fail-closed semantics. In some embodiments, evidence diversity thresholds require corroboration across independent sources or modalities to reduce reliance on any single manipulable input stream, without limitation.

F. Attested Execution Environment (AEE) and Trusted Compute Boundary

In some embodiments, the AEE 150 comprises a trusted execution environment (TEE), a hardware security module (HSM), a secure enclave, a trusted hypervisor boundary, or another remotely attestable trusted compute boundary. In some embodiments, the AEE comprises any execution boundary capable of producing verifier-consumable integrity evidence that binds evaluation to measured software and/or hardware state, including but not limited to TEEs, HSM-backed services, attested virtual machines, signed build provenance, quorum-attested execution, or combinations thereof. In some embodiments, the one or more evidence bundles 142 include one or more external governance artifacts produced by a permit-before-actuate (PBA) rail, including at least one of an execution permit, a policy-compliance receipt, a certification result, or a validator transcript, and such artifacts are consumed as evidentiary inputs without altering the actuation-gate semantics described herein.

In some embodiments, the AEE 150 produces an attestation report 156 binding evaluation to: (i) measurement(s) of the trusted compute boundary 152, (ii) a policy pack digest/version, and (iii) digests of canonicalized inputs and evidence commitments consumed during evaluation.

In some embodiments, policy evaluation is performed deterministically such that re-evaluation of the same canonical inputs under the same policy pack yields the same deterministic outcome and reason codes, subject to defined nondeterminism controls.

Figure 5:
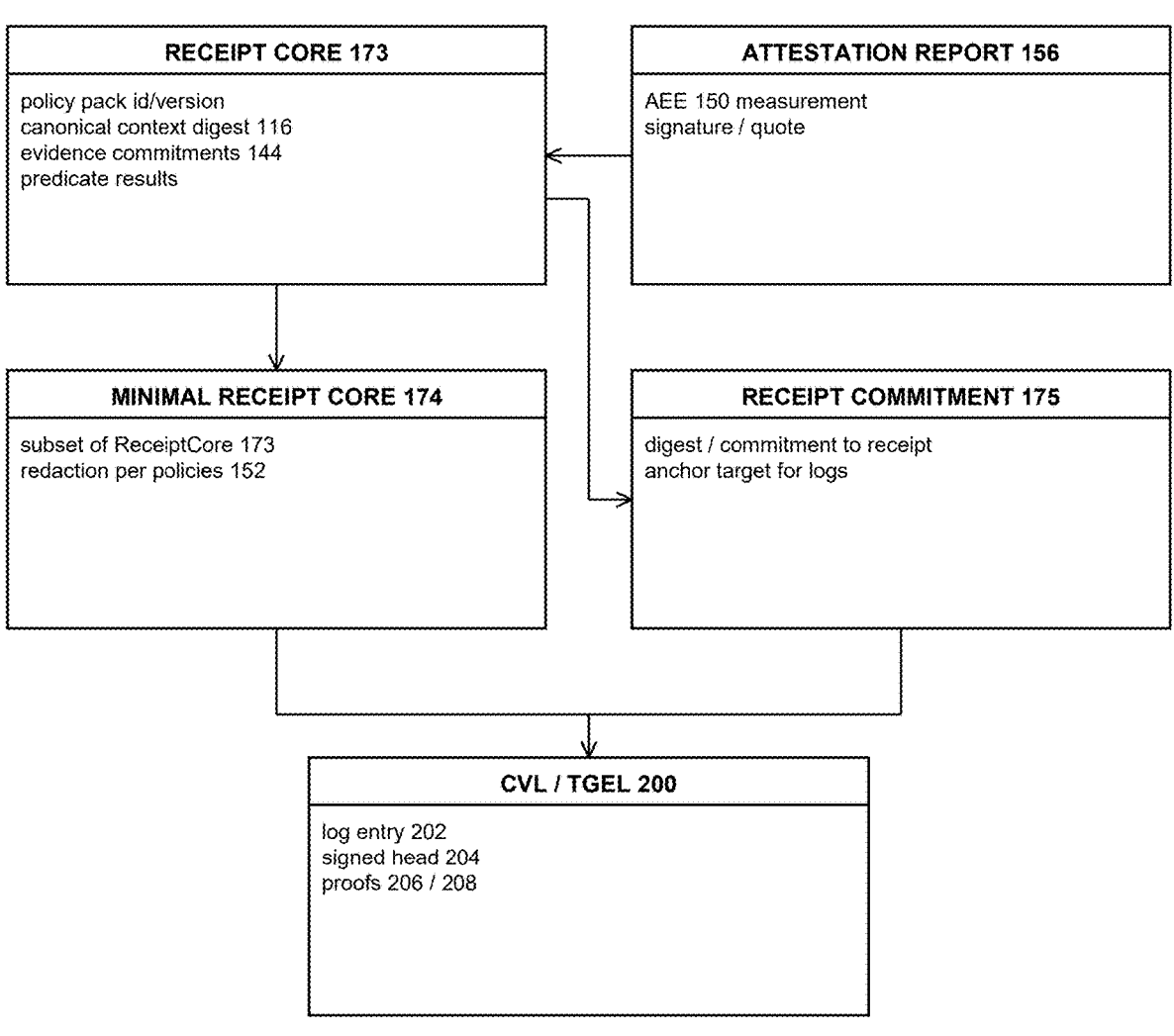
FIG. 5 depicts PoPC receipts including a ReceiptCore, a Minimal ReceiptCore, selective-disclosure fields, and optional privacy-preserving proof segments.

G. PoPC Receipts, ReceiptCore, Minimal ReceiptCore, and Selective Disclosure (FIG. 5)

In some embodiments, the receipt service 170 constructs a PoPC receipt 172. The PoPC receipt 172 may include a ReceiptCore 173 and optional extended fields.

In some embodiments, the ReceiptCore 173 includes: a receipt identifier, policy pack identifier/version, policy digest, canonical context digest 116, evidence commitment(s) 144, evaluation outcome, accountable principal identifier(s), approval commitment(s), validity interval, timestamp(s), and attestation reference/digest, without limitation. In some embodiments, the ReceiptCore 173 further includes at least one of a monotonic counter value, an issuance sequence number, or a concurrency-prevention field used to mitigate replay across gates and time windows.

In some embodiments, the ReceiptCore 173 includes one or more correlation fields enabling replay-verifiable linkage between context canonicalization, permit issuance, and time-of-use enforcement, including without limitation: a context_field_list_digest (or inclusion-manifest digest), an idempotency key reference, a commit marker reference, and/or a write-back finalization reference. In some embodiments, such correlation fields are included in the ReceiptCore 173 and optionally omitted from the Minimal ReceiptCore 174 according to a redaction map while preserving verifiability of the receipt commitment 175.

In some embodiments, the receipt service 170 signs the PoPC receipt 172 or ReceiptCore 173 using a signing key protected by the trusted compute boundary 152 or controlled by a governing authority.

In some embodiments, a Minimal ReceiptCore 174 is derived from the ReceiptCore 173. The Minimal ReceiptCore 174 omits sensitive details while preserving fields sufficient for independent verification of anchoring, scope binding, and time validity.

In some embodiments, selective disclosure is supported using a redaction map 402 that specifies which fields are disclosable to which verifier class. In some embodiments, privacy-preserving proof segments (including zero-knowledge proofs) are included to attest to satisfaction of selected predicates without revealing sensitive attributes.

Figure 6:
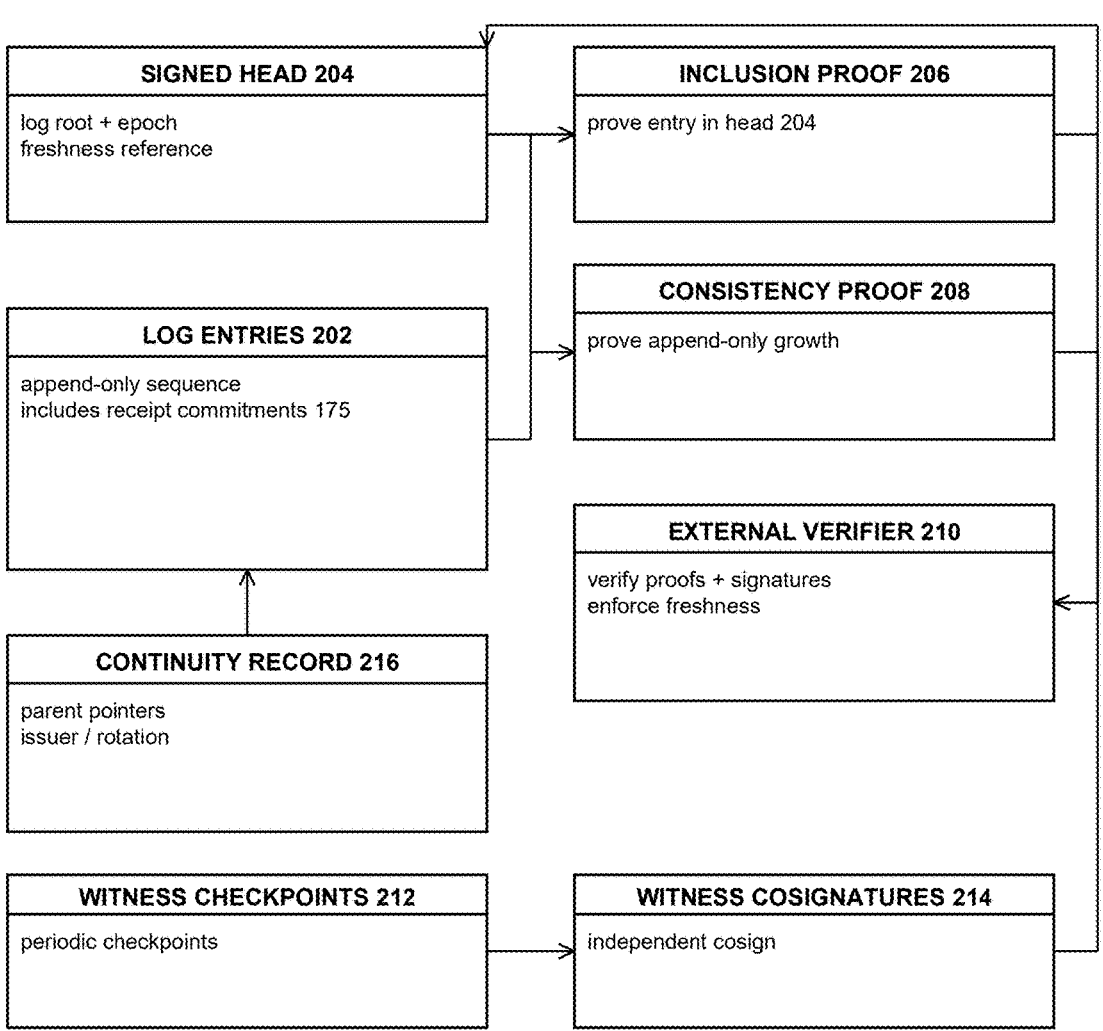
FIG. 6 depicts a CVL that publishes signed heads, provides inclusion and consistency proofs, and enforces an MMD freshness policy.

H. Continuity-Verified Logs (CVL/TGEL), Signed Heads, Proofs, and Equivocation Defense (FIG. 6)

In some embodiments, the CVL/TGEL 200 is an append-only, continuity-verified structure that stores log entries 202 and publishes signed heads (SH) 204. In some embodiments, the CVL/TGEL 200 may be implemented using any append-only structure that supports independent detection of equivocation and supports verification of (a) inclusion of a commitment under a signed head and (b) append-only evolution between signed heads, regardless of underlying data structure. A signed head 204 may comprise, by way of example: a signed_head_id, a head_timestamp, a staleness_interval, a log_id, and an optional witness_checkpoint_ref.

In some embodiments, the CVL/TGEL 200 provides inclusion proofs 206 indicating inclusion of a commitment under a signed head 204, and provides consistency proofs 208 indicating append-only evolution between signed heads 204.

In some embodiments, the system enforces a maximum merge delay (MMD) freshness policy requiring that a receipt commitment 175 be included under a sufficiently fresh signed head 204 and that proof artifacts be available within a defined bound.

In some embodiments, the system maintains a continuity record 216 comprising observed signed heads 204 and verified consistency proofs 208 to detect equivocation, removal, or reordering.

In some embodiments, equivocation defense is strengthened using one or more of: witness cosignatures 214, witness checkpoints 212, gossip protocols among verifiers 210, and multi-verifier continuity records, such that inconsistent signed heads 204 can be detected by independent parties.

In some embodiments, witness mechanisms and verifier gossip are optional and may vary across deployments while preserving the fail-closed gating property.

Figure 7:
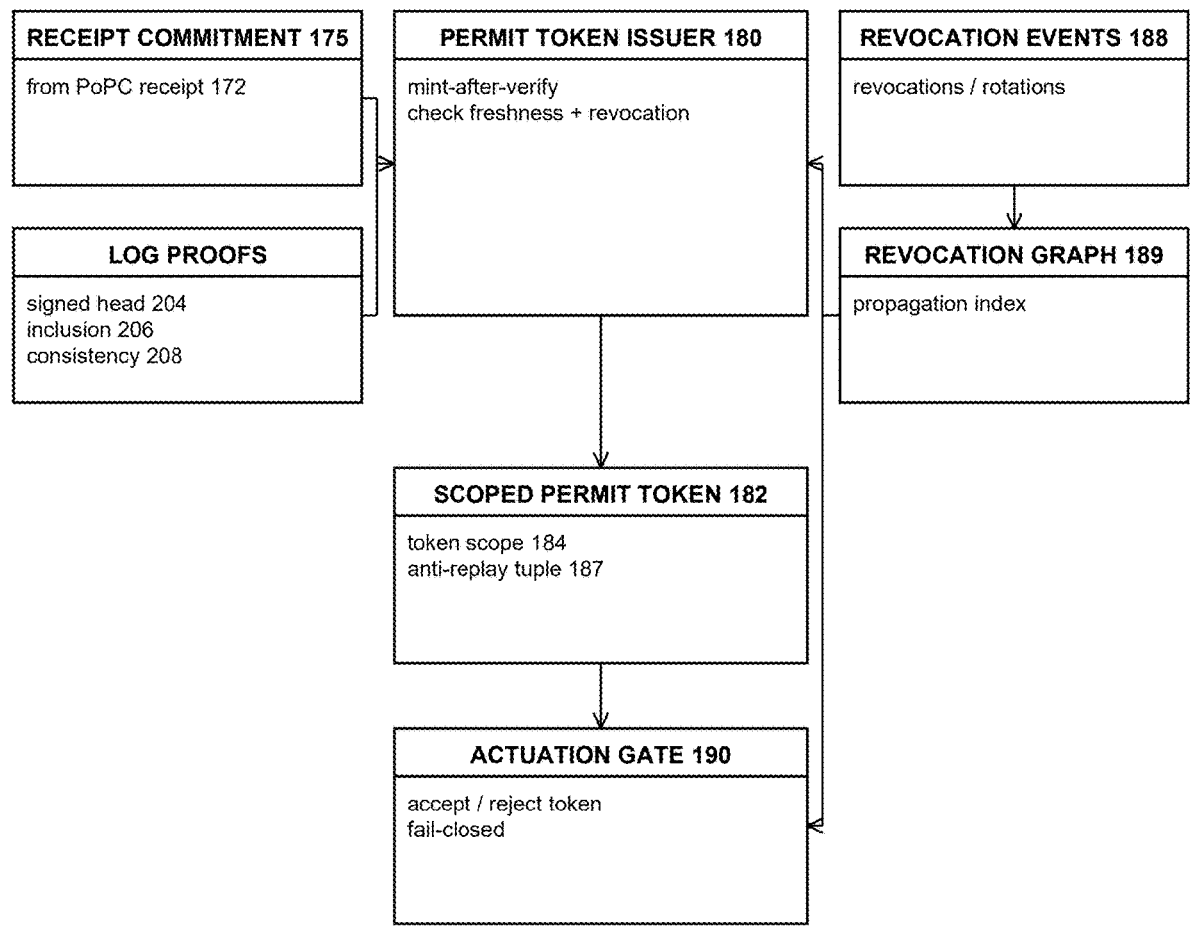
FIG. 7 depicts mint-after-verify issuance of a scoped permit token bound to a receipt commitment and a token scope, including anti-replay and revocation support.

I. Mint-After-Verify (MAV) Permit Issuance, Token Scope Binding, and Revocation Propagation (FIG. 7)

In some embodiments, after receipt anchoring, the permit engine 120 performs mint-after-verify (MAV) to issue a scoped permit token 182 only after (i) successful verification of inclusion of a receipt commitment 175 under a signed head 204 of the CVL/TGEL 200 that satisfies a freshness policy (e.g., a maximum merge delay (MMD) bound) and (ii) upon reliance on a newer signed head 204 than a previously observed signed head 204, successful verification of append-only evolution using a consistency proof 208 and update of a continuity record 216.

In some embodiments, the scoped permit token 182 is cryptographically bound to: (i) the receipt commitment 175 derived from a PoPC receipt 172, (ii) a token_scope 184 describing an allowed actuation envelope, (iii) a gate_id identifying an actuation gate 190, and (iv) an audience_id identifying an intended relying party, as applicable. In some embodiments, the scoped permit token 182 is further cryptographically bound to at least one of a context label 118 or a token-purpose domain-separation label (e.g., a versioned label for permit tokens), such that any mismatch between an expected label and a committed label maps to fail-closed denial at the actuation gate 190 and emission of an SP-F record 300.

In some embodiments, token_scope 184 comprises, without limitation, an operation_class, a parameter_envelope, a bounded_region, and a time_window, and in some embodiments further comprises one or more of an operation identifier, an effect type identifier, a target/resource identifier or class, or a risk classification, such that any deviation from token_scope 184, or any attempt to use the scoped permit token 182 outside the allowed actuation envelope, results in fail-closed denial at the actuation gate 190 and emission of an SP-F record 300.

In some embodiments, a token scope and/or receipt core includes or is bound to an environment identifier and/or partition identifier (e.g., operational vs. test/certification), and a mismatch maps to fail-closed denial and emission of an SP-F record, preventing cross-environment replay without limitation.

In some embodiments, the scoped permit token 182 includes an anti-replay tuple 187 and a bounded validity interval. In some embodiments, the scoped permit token 182 is single-use or limited-use and is invalidated upon use by updating anti-replay state at the actuation gate 190 or within a trusted store. In some embodiments, the anti-replay tuple 187 comprises a nonce and a monotonic counter that together form a concurrency-prevention tuple, and any reuse, monotonic counter regression, or concurrent reuse for a same token scope or gate maps to fail-closed denial at the actuation gate 190 and emission of an SP-F record 300. In some embodiments, the bounded validity interval is implemented as a lease that is refreshed within a refresh window 186, and failure to refresh within the refresh window 186 causes the scoped permit token 182 to be treated as HOLD and then to auto-expire to DENY by expiration at the actuation gate 190.

In some embodiments, the system supports revocation by anchoring revocation events 188 to the CVL/TGEL 200, caching revocation metadata, and enforcing revocation at the actuation gate 190. In some embodiments, a revocation event 188 invalidates at least one of a scoped permit token 182, a receipt commitment 175, an accountable principal credential, or an approval commitment, and revocation enforcement is performed as part of a time-of-use check prior to enabling actuation.

In some embodiments, revocation propagation is represented as a revocation propagation graph 189 or revocation index that links a revocation event 188 to affected receipt commitments 175, affected permit tokens 182, and/or downstream privileges, enabling efficient gate-enforced denial and verifier revalidation. In some embodiments, revocation propagation supports transitive invalidation, such that revocation of an upstream artifact causes invalidation of one or more downstream artifacts that are bound to, derived from, or authorized by the upstream artifact.

In some embodiments, revocation propagation includes distribution of revocation metadata to one or more of verifier caches, relying party caches, and gate caches, subject to disclosure rules and partitioning policies. In some embodiments, caches enforce bounded staleness for revocation metadata, and failure to obtain sufficiently fresh revocation metadata within a configured bound maps to HOLD and then DENY at the actuation gate 190 absent satisfaction of freshness constraints.

Figure 8:
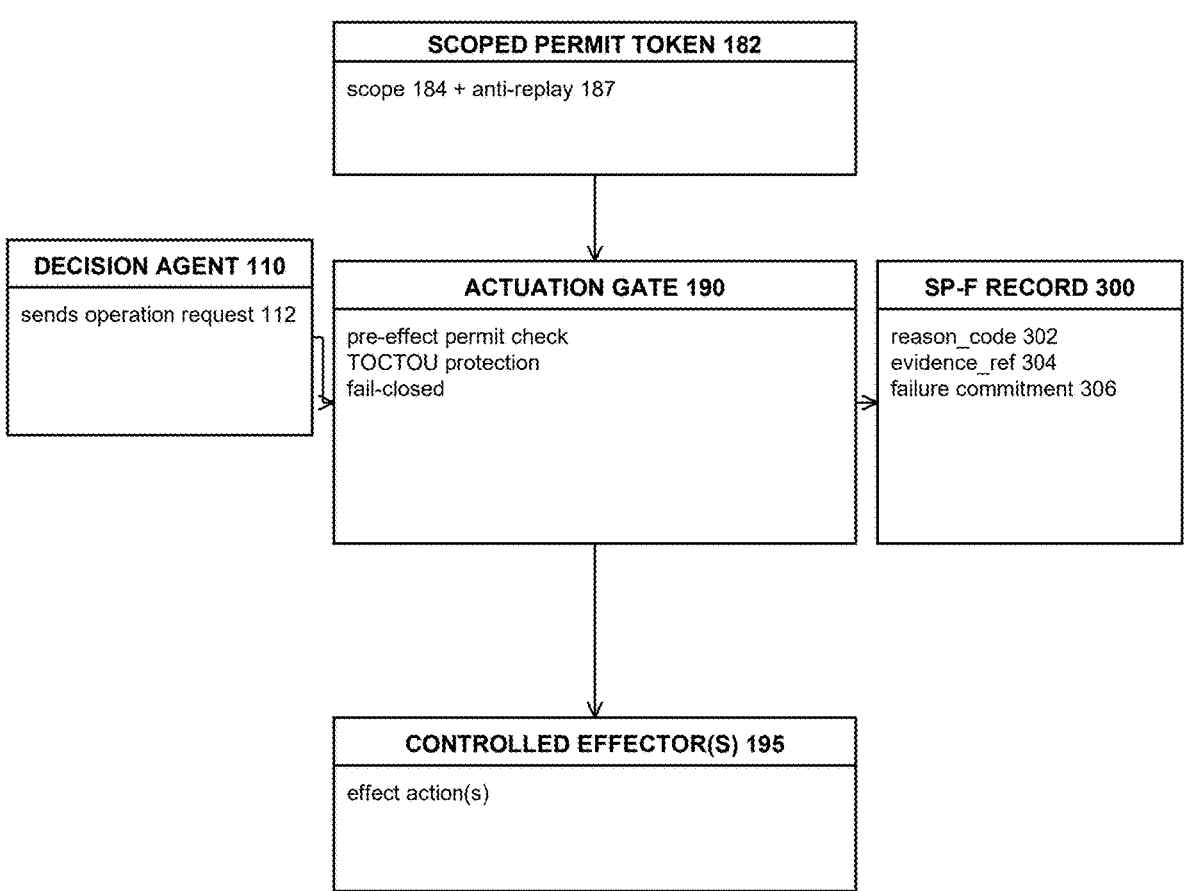
FIG. 8 depicts example fail-closed actuation gate architectures including a device-side latch, a firmware gate, a kernel hook, a hypervisor gate, and a network enforcement point, with TOCTOU checks.

J. Fail-Closed Actuation Gate Patterns and TOCTOU Enforcement (FIG. 8)

In some embodiments, the actuation gate 190 is implemented at a device boundary, including but not limited to firmware controlling a latch interface, a secure enclave controlling a command channel, a kernel module gating privileged system calls, a hypervisor gate controlling device assignment, or a network enforcement point gating account or transaction actions.

In some embodiments, enforcement is realized as one or more cooperating gates deployed at different layers (e.g., device, firmware, operating system kernel, hypervisor, network, service sidecar), such that bypass of a single gate does not enable actuation without satisfying the permit verification conditions.

In some embodiments, the actuation gate 190 denies actuation by default and enables actuation only when: (i) the scoped permit token 182 is validated (signature, expiry, anti-replay, scope match, revocation status) and (ii) the receipt commitment 175 anchoring proofs satisfy freshness constraints.

In some embodiments, the actuation gate 190 performs time-of-use revalidation immediately prior to enabling actuation, mitigating time-of-check-to-time-of-use (TOC-TOU) vulnerabilities by re-checking token validity, scope constraints, revocation status, and signed head freshness.

In some embodiments, the actuation gate performs time-of-use verification using a time-of-use signed head that may be newer than a signed head relied upon during permit minting, and verifies inclusion of the receipt commitment under the time-of-use signed head using a corresponding time-of-use inclusion proof, thereby mitigating TOCTOU and stale-proof reliance without limitation.

In some embodiments, the actuation gate 190 enforces idempotent and atomic actuation at time-of-use by requiring satisfaction of an idempotency mechanism (e.g., idempotency key, transaction fence, commit marker, or write-ahead-log barrier) prior to enabling actuation, and by rejecting duplicate or conflicting finalization attempts for a same operation request 112 or a same token scope 184. In some embodiments, detection of duplicate finalization, partial finalization, or split-brain conditions maps to fail-closed denial, emission of an SP-F record 300, and optional anchoring of a failure commitment.

In some embodiments, the actuation gate 190 produces an SP-F record 300 upon any failure, including deterministic reason codes and evidence references to support auditability of denials and holds. In some embodiments, a HOLD outcome is time-bounded by a hold_deadline 308 and auto-expires to DENY absent receipt anchoring proofs that satisfy freshness constraints prior to the hold_deadline 308.

Figure 14:
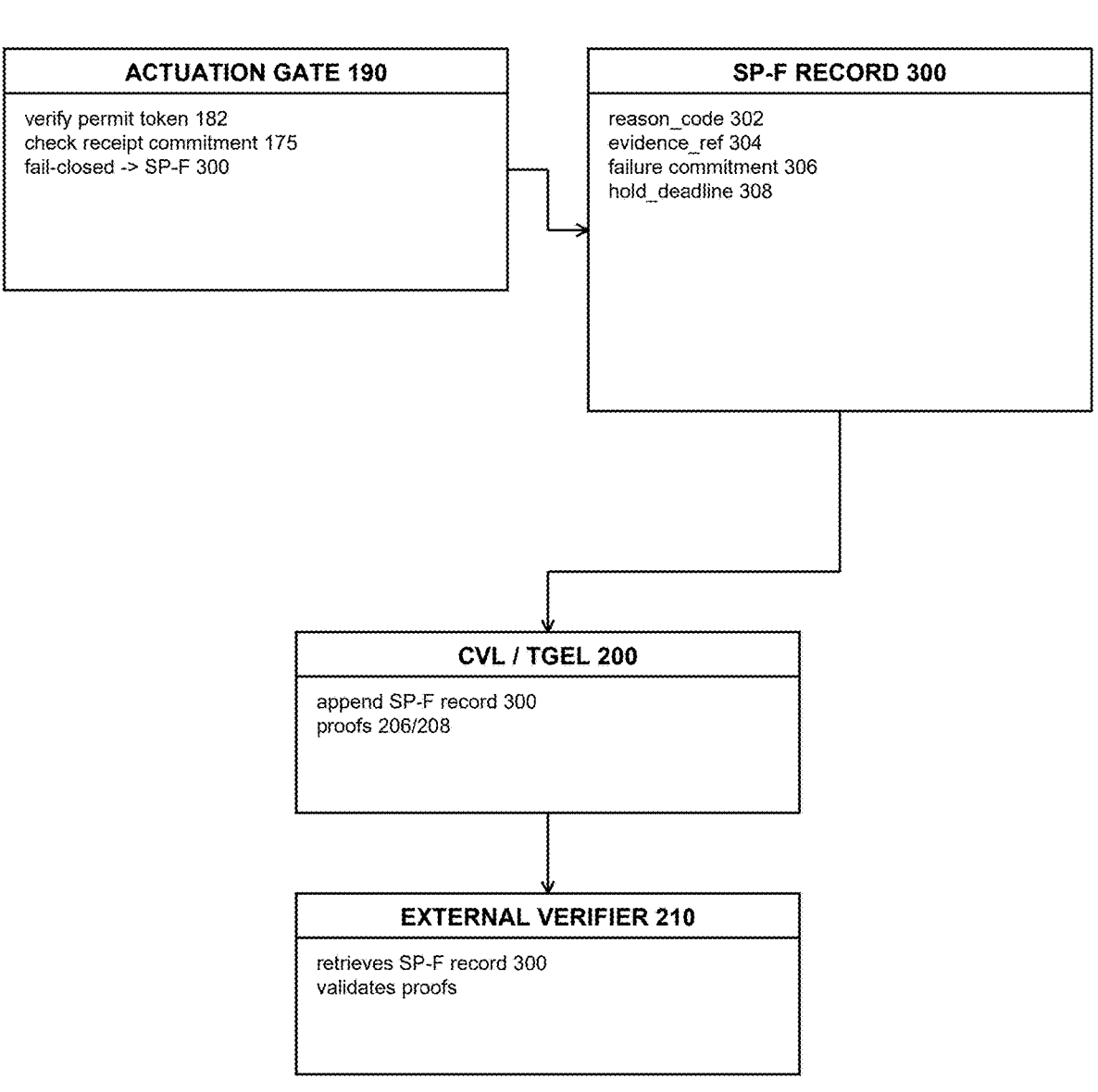
FIG. 14 depicts structured precondition failure (SP-F) records including deterministic reason codes, evidence references, hold deadlines, and anchoring of failure commitments for replay-verifiable denials and holds.

K. Structured Precondition Failure (SP-F), Deterministic Reason Codes, and Failure Anchoring (FIG. 14)

In some embodiments, SP-F record 300 includes a reason code 302 selected from a deterministic reason-code registry and an evidence_ref 304 identifying proof artifacts relevant to the failure, such as signed head identifiers, inclusion proof references, consistency proof references, receipt commitment references, or revocation references. In some embodiments, the reason-code registry is versioned and signed, and a registry identifier or registry version is bound into the SP-F record 300 or its commitment to enable replay-verifiable interpretation of reason codes.

In some embodiments, denial and hold events are treated as verifiable events by anchoring a failure commitment 306 derived from an SP-F record 300 into a CVL/TGEL 200, thereby making denials replay-verifiable and auditable.

Example reason codes are illustrative and non-limiting and may include: PASS, FAIL_POLICY_DENY, FAIL_EVIDENCE_MISSING, FAIL_EVIDENCE_STALE, FAIL_DIVERSITY_THRESHOLD, FAIL_ATTESTATION_INVALID, FAIL_PROOF_INVALID, FAIL_HEAD_STALE, FAIL_TOKEN_EXPIRED, FAIL_TOKEN_SCOPE, FAIL_REVOKED, FAIL_REPLAY, FAIL_CONTEXT_LABEL_MISMATCH, HOLD_PROOF_PENDING, HOLD_FRESHNESS_PENDING, and HOLD_EXPIRED.

Figure 9:
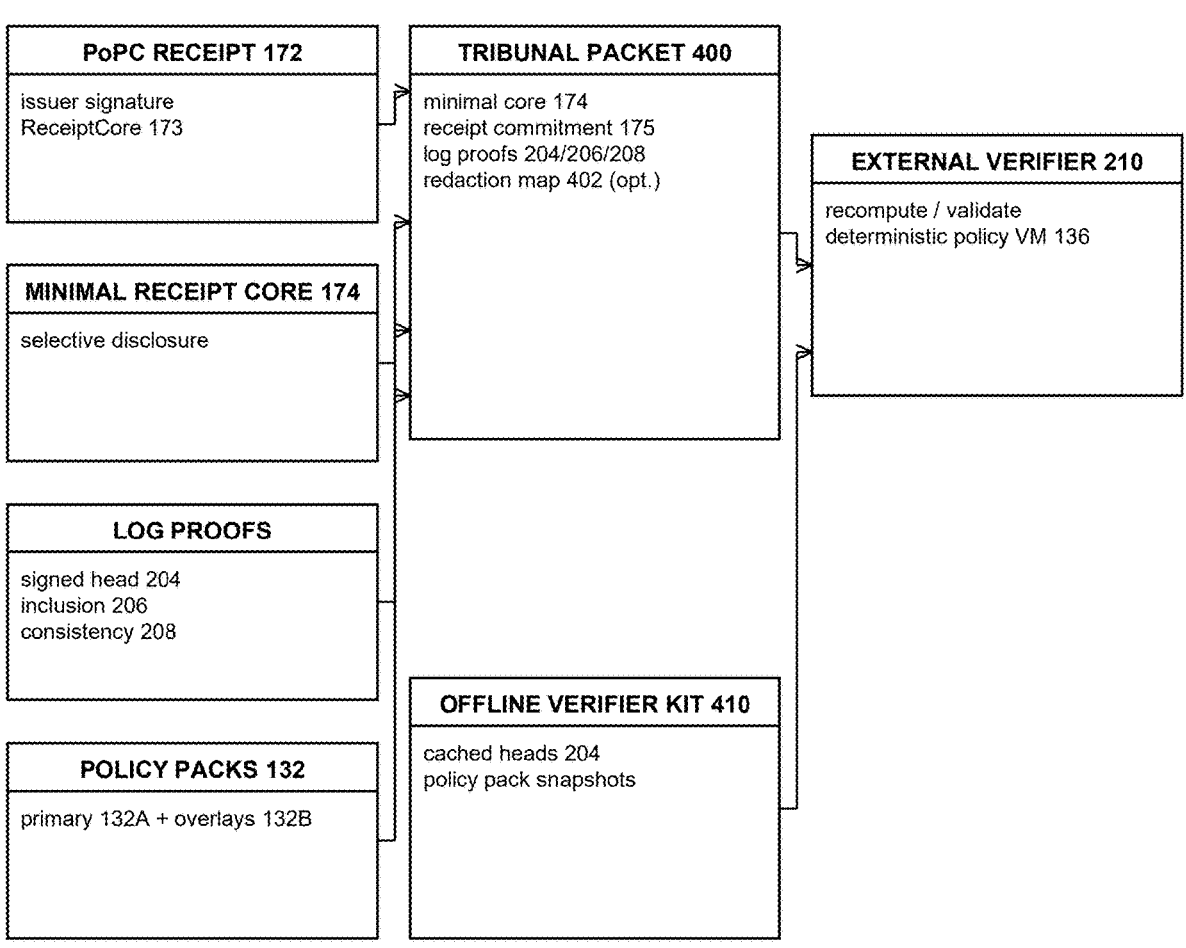
FIG. 9 depicts an offline verifier kit using cached signed heads and associated proofs within a bounded window.
Figure 10:
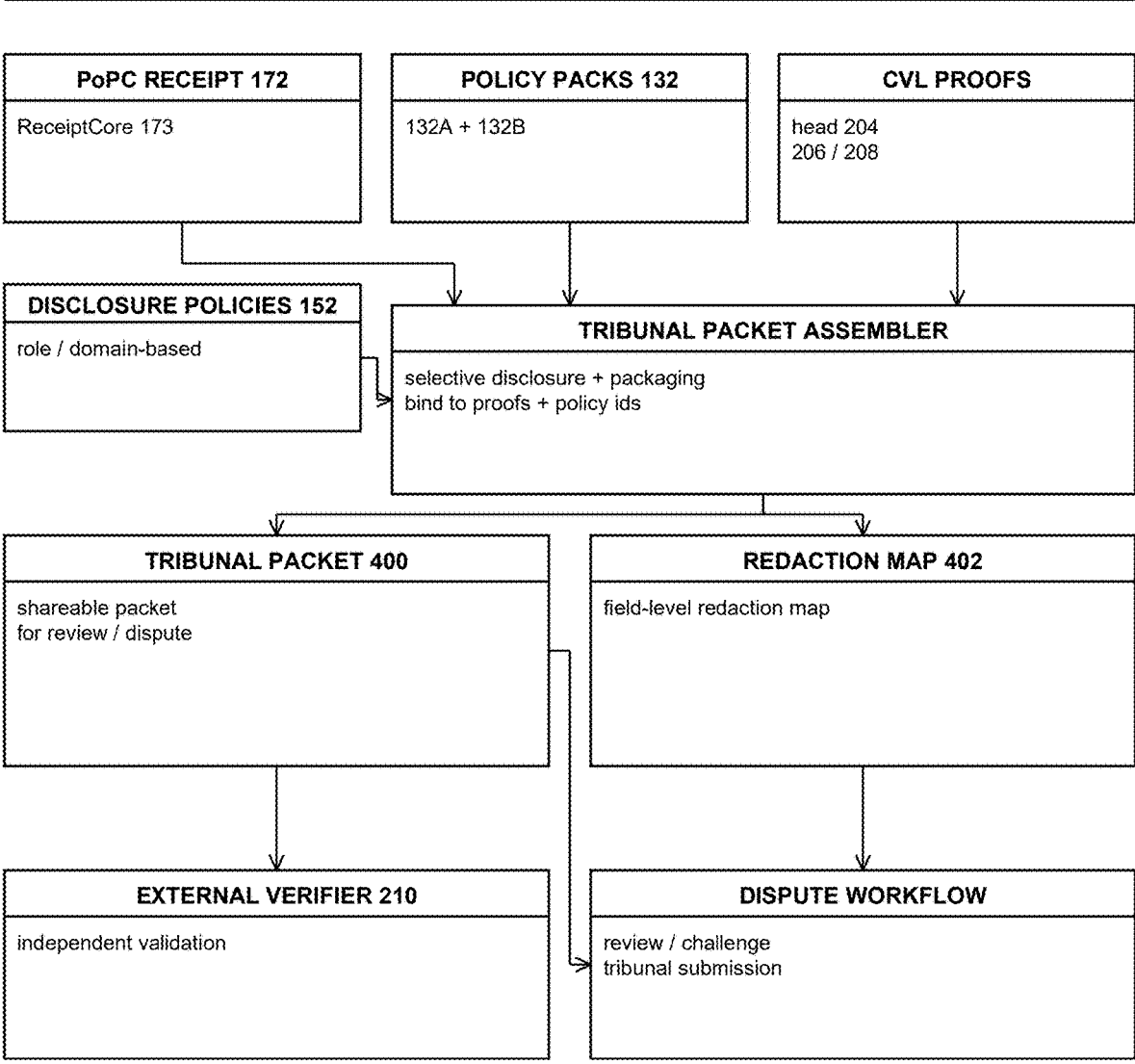
FIG. 10 depicts tribunal packet assembly, including redaction domains and dispute-resolution workflows.
Figure 12:
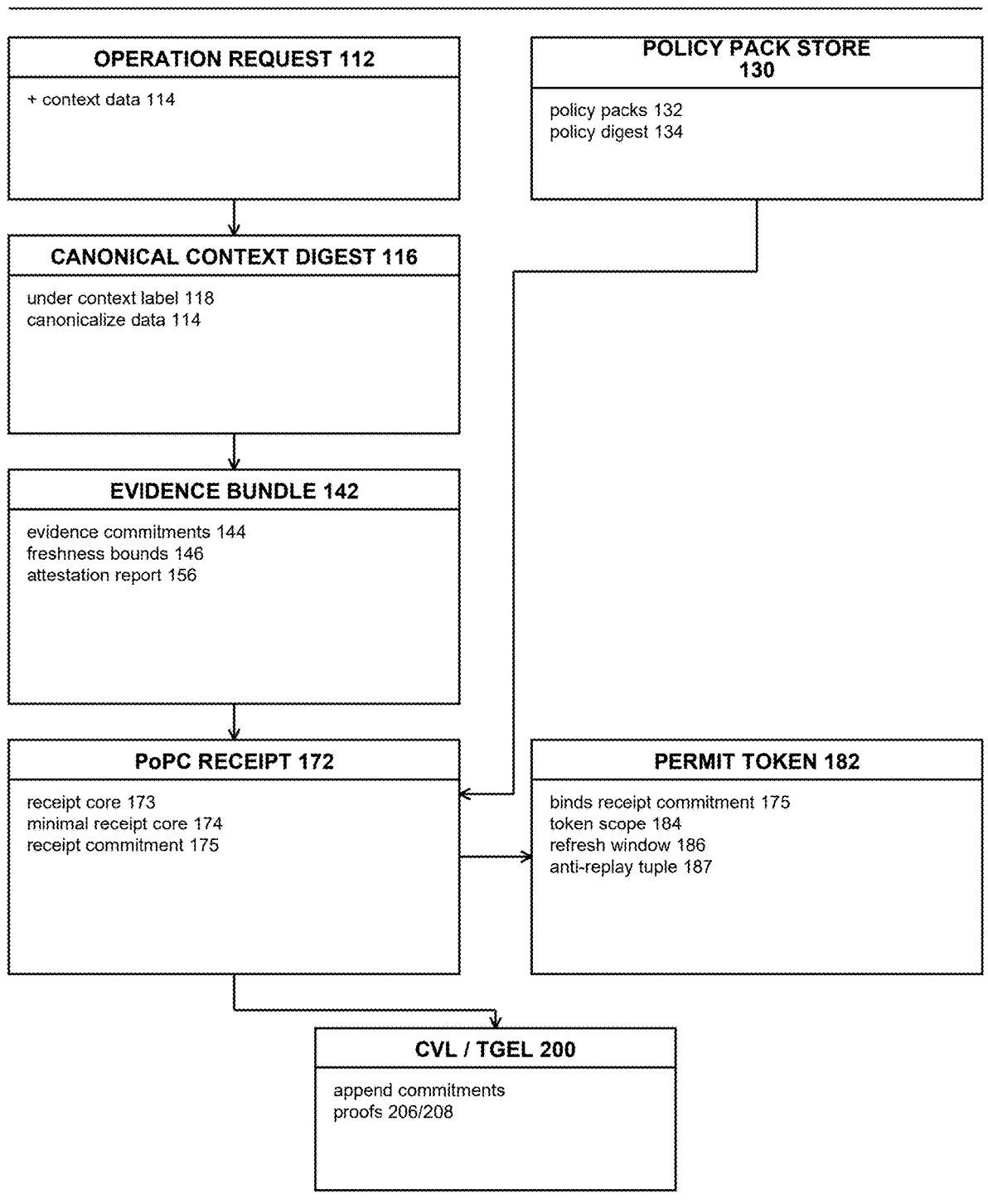
FIG. 12 depicts operation-request canonicalization, context-label binding, and generation of context and evidence commitments used for deterministic policy evaluation and receipt-commitment derivation.

L. Independent Verification, Tribunal Packets, and Offline Verifier Kits (FIGS. 9-10)

In some embodiments, external verifiers 210 retrieve tribunal packets 400 comprising: Minimal ReceiptCore 174, receipt commitments 175, signed head identifiers, inclusion proofs 206, consistency proof references 208, attestation references, and revocation status evidence.

In some embodiments, an external verifier 210 produces a verification report 420 that includes: (i) a verification determination, (ii) one or more deterministic reason codes bound to a reason-code registry version, and (iii) an evidence reference identifying at least one of a signed head identifier, an inclusion proof reference, a consistency proof reference, a receipt commitment reference, or a revocation reference sufficient to support replay verification.

In some embodiments, the verification report 420 is packaged as a procurement-ready compliance artifact 430 suitable for submission to an auditor, regulator, safety board, or procurement authority, and may include or reference a tribunal packet 400 and one or more verification procedures or conformance checks.

In some embodiments, the external verifier 210 assembles a dispute packet 440 comprising at least the verification report 420 and one or more referenced proof artifacts for submission to an oversight entity, arbitration process, or dispute-resolution workflow.

In some embodiments, tribunal packets 400 include redaction domains and mappings (e.g., a redaction map 402) that separate shareable Minimal ReceiptCore fields from restricted fields while preserving verifiability of anchoring and scope binding.

In some embodiments, an offline verifier kit 410 includes cached signed heads 204 and proofs (including inclusion proofs 206 and, as needed, consistency proofs 208) within a bounded window and verification procedures enabling independent verification without online connectivity for at least a defined interval.

In some embodiments, independent recomputation is supported by providing deterministic policy evaluation artifacts sufficient to re-evaluate policy predicates given committed evidence and canonical context digests, subject to disclosure constraints.

M. Simulation, Training, Testing, and Certification Modes

In some embodiments, the system operates in simulation, training, or test modes (simulation subsystem 500), in which operation requests 112 are evaluated, receipts are generated and anchored, but physical or external actuation is suppressed.

In some embodiments, the CVL/TGEL 200 is partitioned into an operational partition 502 and a test or certification partition 504 with distinct access controls, retention policies, and disclosure rules.

Figure 13:
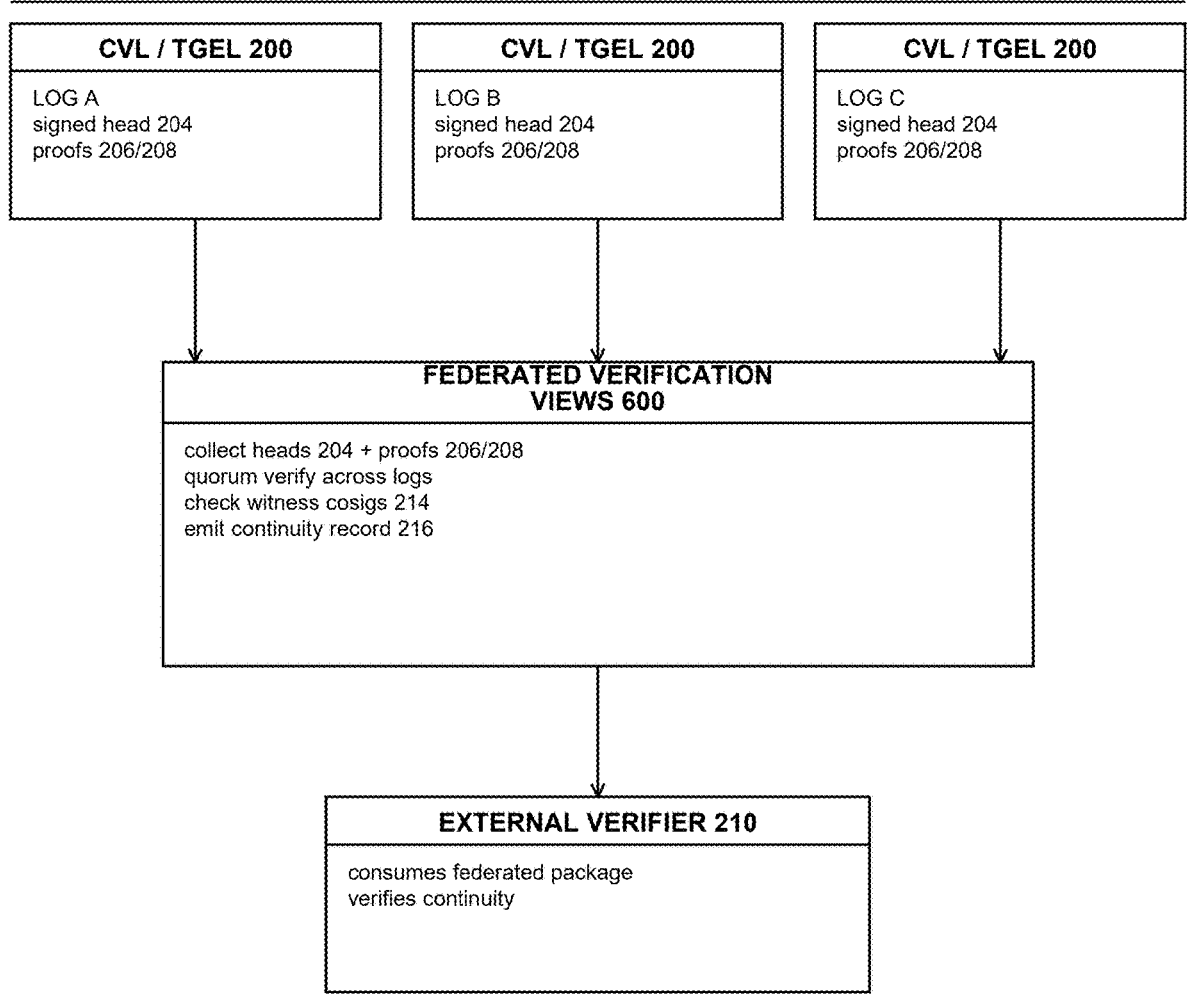
FIG. 13 depicts federation and multi-log anchoring across stakeholder domains, including federated verification views and multi-log proof conditions for permit issuance.

N. Federation, Multi-Log Anchoring, and Stakeholder Domains (FIG. 13)

In some embodiments, multiple organizations operate multiple CVLs and the system supports federated verification views 600 under agreed trust anchors.

In some embodiments, coalition overlays require that receipts be anchored in multiple logs and that permits be issued only after multi-log proof conditions are satisfied, including AND conditions across a primary log and one or more overlay logs.

In some embodiments, federation includes cross-log correlation of receipt commitments and proof artifacts while enforcing redaction and disclosure rules.

O. Implementation Notes

The components described herein may be combined, split, or distributed across multiple computing nodes, networks, organizations, and administrative domains. In some embodiments, the disclosed systems and methods are deployed to reduce harm and protect individuals and communities by preventing unverified high-stakes actions; such objectives are illustrative and non-limiting and do not restrict claim scope. Deployment domains may include, without limitation, agentic AI orchestration platforms and safety rails for automated workflows, autonomous vehicles and mobility systems, robotic surgery and clinical robotics platforms, industrial control systems and critical-infrastructure operations, financial and settlement systems, healthcare decision-support and controlled record systems, cloud and enterprise automation platforms, and defense or public-safety systems. In some embodiments, the same architectural pattern may be applied, without limitation, to future categories of high-stakes effectors and automated decision systems as they emerge, including where such systems expose an actuation surface that can be gated by permit-before-actuate semantics and continuity-verified proof-of-policy-compliance receipts.

The specific cryptographic algorithms, serialization formats, attestation technologies, and log implementations may vary. The disclosed architectures are intended to be implementation-agnostic while preserving the described safety and verifiability properties.

In some embodiments, cryptographic bindings, signatures, and commitment functions are algorithm-agile and may use one or more cryptographic suites including post-quantum or hybrid constructions, without limitation, while preserving the described verifiability and fail-closed properties.

In some embodiments, compromise response includes anchoring and propagating revocation events that invalidate one or more of permits, receipts, receipt commitments, credentials, policy pack versions, signing keys, or other privileges, and enforcing revocation at mint time and/or time-of-use, without limitation. In some embodiments, key-status records, rotation epochs, witness strengthening, and/or multi-log verification reduce reliance on a single operator view and mitigate rollback, equivocation, or stale-state reliance.

APPENDICES

The following appendices provide illustrative, non-limiting examples of terminology, registries, schemas, conformance guidance, and verifier procedures that may be used with the disclosed embodiments. Unless expressly recited in the claims, the appendices are informative examples provided to facilitate understanding, interoperability, and independent verification. In some embodiments, appendix content is packaged or incorporated into independent verifier kits, conformance packs, and/or procurement-ready compliance artifacts for audit, procurement, or dispute-resolution workflows. The appendices are not exhaustive and do not restrict claim scope; implementations may omit, extend, reorder, or replace any appendix material and may use functionally equivalent structures, fields, encodings, or procedures. In the event of any inconsistency, the claims control, followed by the specification, and then the appendices.

Appendix A—Glossary (Illustrative; Non-Limiting)

This glossary is illustrative and non-limiting. Unless otherwise stated, the terms below are intended to be broad, implementation-agnostic, and inclusive of equivalents. In the event of any inconsistency between a glossary entry and the claims, the claims control.

Accountable Principal. A person, organization, role, or system identity that is accountable for an operation request, a policy decision, issuance of a permit, and/or an actuation outcome. In some embodiments, the accountable principal is represented by an identifier, a credential, a signing key reference, an authorization chain, or a pseudonymous identifier with revocable mapping.

Actuation. Any physical or informational effect that changes state or causes an external consequence, including, without limitation, device control, robotics control, industrial control, access control, privileged command execution, account actions, transaction dispatch, message dissemination, content publication, network actions, and other actions that materially affect people, assets, safety, or outcomes.

Actuation Gate. A control point (e.g., actuation gate 190) that prevents actuation unless one or more verification conditions are satisfied. In some embodiments, an actuation gate is implemented in firmware, a secure enclave, an operating system kernel, a hypervisor, a service sidecar, a network enforcement point, or combinations thereof. In some embodiments, the actuation gate enforces default non-actuation and performs time-of-use revalidation (TOC-TOU mitigation) prior to enabling actuation.

Agentic AI Orchestration Platform. A platform, service, framework, or control plane that coordinates one or more autonomous or semi-autonomous software agents (including AI model-based agents) to plan, select, and invoke tools, services, or workflows and to issue, schedule, or mediate downstream actions on external systems (including controlled effectors or functionally equivalent actuation surfaces), optionally under human-in-the-loop control, policy constraints, and governance or audit requirements, without limitation.

Anti-Replay Tuple. One or more values used to prevent replay, reuse, or concurrent reuse of a permit token or equivalent actuation privilege, including, without limitation, a nonce, a monotonic counter, a sequence number, a one-time token identifier, a windowed lease identifier, or combinations thereof. In some embodiments, anti-replay enforcement includes detecting nonce reuse, counter regression, or concurrent reuse within a defined scope (e.g., same gate_id or token_scope) and mapping such detection to fail-closed denial.

Attested Execution Environment (AEE). An execution boundary capable of producing integrity evidence consumable by a verifier. In some embodiments, an AEE includes a trusted execution environment (TEE), an HSM-backed service, an attested virtual machine, a trusted hypervisor boundary, signed build provenance, quorum-attested execution, or combinations thereof.

Attestation Report. Verifier-consumable integrity evidence binding an evaluation to measured software and/or hardware state. In some embodiments, an attestation report binds evaluation to a policy pack digest or version, canonicalized inputs, evidence commitments, and/or a trusted compute measurement.

Canonical Context Digest. A cryptographic digest derived from deterministic canonicalization of operation context data (e.g., canonical context digest 116). In some embodiments, the digest is domain-separated by a context label (e.g., context label 118) and is used to bind an operation request to policy evaluation, receipt issuance, and permit issuance.

Canonicalization. Deterministic transformation of data into a canonical representation suitable for reproducible hashing and verification. Canonicalization may include serialization rules, normalization rules, ordering rules, and/or domain-separation labels. In some embodiments, canonicalization is parameterized by a canonicalization identifier and a context label, and mismatches map to fail-closed denial.

Coalition Overlay. One or more additional policy layers supplied by distinct stakeholders, regulators, auditors, coalition partners, or oversight entities (e.g., overlay policy layers 132B). In some embodiments, overlay layers impose additional constraints beyond a primary policy layer and are composed using specified composition semantics.

Commitment. A cryptographic binding to data, including, without limitation, a hash digest, a Merkle root, a hash chain value, a signed digest, or another commitment scheme. In some embodiments, commitments are used to bind evidence, context, receipts, denials, revocations, manifests, or certifications to proof artifacts.

Consistency Proof. A proof that indicates append-only evolution between two signed heads or checkpoints (e.g., consistency proof 208). In some embodiments, a consistency proof allows a verifier to confirm that a newer log state extends an older log state without removal or reordering of prior entries.

Continuity Record. A record maintained by a verifier or relying party that tracks observed signed heads and verified consistency relationships (e.g., continuity record 216) to detect equivocation, reordering, rollback, or fork conditions. In some embodiments, continuity records include witness checkpoint references and key-rotation epochs.

Continuity-Verified Log (CVL). An append-only structure that publishes signed heads and supports verification of inclusion and append-only evolution (e.g., CVL/TGEL 200). In some embodiments, a CVL is implemented as a transparency log, a Merkle log, a witness-cosigned log, a checkpointed append-only log, or another continuity-verifiable structure.

Controlled Effector. Any component capable of producing an actuation, including physical effectors and informational effectors (e.g., controlled effector 195). A controlled effector may be a device, a software service, an account, a network function, a publication channel, or another effect-producing component.

Deterministic Reason Code. A code selected from a deterministic registry that identifies a policy outcome, failure cause, hold condition, or verification outcome. In some embodiments, the registry is versioned and signed, and the registry identifier or registry digest is bound into an SP-F record, a receipt, a verification report, or a commitment.

Evidence Bundle. A collection of one or more evidence items referenced by an operation request and/or required by a policy predicate (e.g., evidence bundles 142). Evidence bundles may include sensor observations, audit artifacts, provenance records, approval records, prior receipts, external attestations, external governance artifacts, or other data.

Evidence Commitment. A commitment to one or more evidence items or evidence bundles (e.g., evidence commitments 144). In some embodiments, an evidence commitment includes a digest, a Merkle root, and/or a signed digest, and is bound into a receipt, a permit issuance condition, or a verification artifact.

Freshness Bound. A constraint that limits the acceptable age, staleness, or validity interval of evidence, proofs, signed heads, tokens, or other artifacts. Freshness bounds may include, without limitation, staleness intervals, time windows, maximum merge delay (MMD) policies, and bounded cache staleness, and may be parameterized by operation class or risk classification.

Gate Identifier (gate_id). An identifier for an actuation gate or a class of gates. In some embodiments, a permit token is cryptographically bound to a gate_id to prevent reuse across gates or gate classes.

Inclusion Proof. A proof that indicates inclusion of a commitment under a signed head, checkpoint, or log state (e.g., inclusion proof 206). In some embodiments, an inclusion proof is a Merkle inclusion proof or another membership proof.

Maximum Merge Delay (MMD). A freshness policy that bounds the delay between creation of a commitment and its inclusion under a sufficiently fresh signed head. In some embodiments, MMD policies are used to ensure timely anchoring and timely availability of proof artifacts.

Minimal ReceiptCore. A minimized receipt representation that omits restricted fields while preserving fields sufficient for independent verification of anchoring, scope binding, and time validity (e.g., Minimal ReceiptCore 174). In some embodiments, a Minimal ReceiptCore is used to derive a receipt commitment.

Mint-After-Verify (MAV). A process that issues a permit token only after one or more verification conditions are satisfied, including, in some embodiments, inclusion verification, consistency verification, and freshness verification.

Operation Request. A request to perform an actuation with associated context data, targets, and constraints (e.g., operation request 112). An operation request may be proposed by a decision agent under human control, semi-autonomous control, or autonomous control.

Overlay Policy Layer. A policy layer supplied by a stakeholder distinct from a primary policy owner. Overlay layers may be composed using conjunction, disjunction, precedence or override rules, threshold rules, lattice-based constraints, conflict-resolution policies, or other specified semantics.

Policy Pack. A versioned, portable representation of one or more machine-enforceable policy predicates (e.g., policy packs 132). A policy pack may include rules, models, parameters, modules, signatures, provenance metadata, compilation outputs, overlay semantics, and/or approval metadata, without limitation.

Policy Virtual Machine (Policy VM). A deterministic execution environment for evaluating policy predicates (e.g., policy VM 136). In some embodiments, the policy VM produces deterministic outcomes, traces, and reason codes given canonicalized inputs and a policy pack.

Proof-of-Policy-Compliance (PoPC) Receipt. A receipt that encodes information sufficient to support replay-verifiable evidence of policy application for an operation request (e.g., PoPC receipt 172). In some embodiments, PoPC receipts bind policy versions, evidence commitments, outcomes, accountable principals, and validity constraints.

Receipt Commitment. A commitment derived from a receipt (e.g., from a Minimal ReceiptCore) and anchored in a CVL/TGEL (e.g., receipt commitment 175). Receipt commitments may be used to bind permit issuance, gate acceptance, and verification to an append-only log state.

ReceiptCore. A receipt structure that includes fields describing policy, evidence, context, outcomes, accountable principals, validity constraints, and associated proof references (e.g., ReceiptCore 173). ReceiptCore may include optional extended fields and selective-disclosure segments.

Revocation Event. A record indicating invalidation of a permit token, a receipt, a credential, an approval, a policy pack version, a signing key, or another privilege (e.g., revocation event 188). In some embodiments, revocation events are anchored to a CVL/TGEL and propagated to gates and verifiers.

Signed Head (SH). A signed representation of a log state (e.g., signed head 204). In some embodiments, a signed head includes a signed_head_id, a timestamp, a staleness interval, a log identifier, and/or a witness checkpoint reference.

Structured Precondition Failure (SP-F). A structured record emitted when one or more preconditions for actuation are not satisfied (e.g., SP-F record 300). In some embodiments, an SP-F record includes a deterministic reason code, evidence references, a hold deadline, and/or a failure commitment anchored to a CVL/TGEL.

Token Scope (token_scope). A representation of an allowed actuation envelope (e.g., token_scope 184). Token scope may include operation class, effect type, parameter envelopes, bounded regions, time windows, target identifiers, risk classifications, and other constraints.

Time-of-Check-to-Time-of-Use (TOCTOU). A class of vulnerabilities where a condition verified at check time may no longer hold at use time. In some embodiments, TOCTOU mitigation includes revalidation of token validity, scope, revocation status, and proof freshness immediately prior to actuation.

Tribunal-Grade Evidence Log (TGEL). An append-only, continuity-verified log instance (or a partition thereof) configured to record, publish, and make available replay-verifiable evidence artifacts sufficient for independent verification, audit, dispute-resolution workflows, adjudication support, and/or procurement compliance workflows. In some embodiments, a TGEL: (i) publishes signed heads (SH) and supports inclusion proofs and consistency proofs; (ii) records one or more typed entry classes including, without limitation, receipt commitments, failure commitments, manifest commitments (e.g., policy manifests, conformance pack references, certification results), reason-code registry commitments, revocation events, key-status records, and optional witness checkpoint or cosignature artifacts; (iii) supports deterministic schemas and canonicalization identifiers for logged artifacts to enable reproducible hashing and interpretation; and (iv) supports partitioning (e.g., operational vs. test/certification), retention, and access controls while preserving append-only verifiability. In some embodiments, a TGEL is implemented as, or alongside, a Continuity-Verified Log (CVL), and may share or differ in operator, trust anchors, and partitions. This definition is illustrative and non-limiting.

Tribunal-Grade. As used herein, "tribunal-grade" is a technical descriptor of evidentiary sufficiency for independent verification and does not require any particular legal forum. In some embodiments, tribunal-grade evidence is replay-verifiable and independently machine-checkable and is sufficient, under disclosed verification procedures, for an independent verifier to determine at least: an applicable policy pack identifier/version and policy digest, any applicable overlay composition semantics (or a digest thereof), canonical context binding (e.g., canonical_context_digest and context label), evidence commitments and applicable freshness bounds, log anchoring evidence (e.g., signed head identifiers and inclusion/consistency proof references), and revocation and/or key-status checks as applicable. This definition is illustrative and non-limiting.

Tribunal Packet. A collection of receipts and proof artifacts assembled to support audit, dispute resolution, adjudication, or compliance verification (e.g., tribunal packet 400). Tribunal packets may include signed head identifiers, inclusion proofs, consistency proof references, attestation references, revocation status evidence, and redaction mappings (e.g., redaction map 402).

Verifier/External Verifier. A party or system that performs independent verification of receipts, proofs, and related artifacts (e.g., external verifiers 210). Verifiers may include auditors, regulators, coalition partners, safety boards, customers, procurement authorities, or independent verifier services.

Witness Checkpoint/Cosignature. A checkpoint, signature, or cosignature from an independent witness used to strengthen equivocation detection or continuity verification in an append-only log (e.g., witness checkpoint 212 and/or witness cosignature 214).

Canonicalization Identifier. An identifier (including a version) that specifies canonicalization rules used to canonicalize context, evidence, manifests, receipts, or tokens. In some embodiments, the canonicalization identifier includes or references a context label and is used to ensure replay-verifiable interpretation across independent verifiers.

Certification Result. An artifact indicating that a policy pack, conformance pack, compiler, policy VM, verifier kit, or other component satisfies one or more conformance checks. In some embodiments, a certification result is signed and a certification commitment derived therefrom is anchored in a CVL/TGEL.

Compiler Measurement Digest. A digest derived from measurement or attestation evidence for a policy pack compiler, policy VM, build provenance, or trusted compute boundary. In some embodiments, the compiler measurement digest is included in a signed policy manifest to bind policy compilation/execution to reproducible measured state.

Conformance Pack. A package of deterministic test vectors and expected outcomes (and, in some embodiments, expected traces or trace commitments) used to validate deterministic evaluation of policy predicates under a specified canonicalization identifier. In some embodiments, conformance packs are distributed with a signed policy manifest and used for pre-use admission.

Context Label. A domain-separation label (e.g., context label 118) included in or committed by canonicalized representations to bind a digest or token to a particular canonicalization domain or purpose. In some embodiments, context-label mismatch maps to fail-closed denial.

Dispute Packet. A package assembled for dispute resolution or oversight workflows. In some embodiments, a dispute packet includes a verification report, deterministic reason codes, and one or more referenced proof artifacts (e.g., signed heads, inclusion proofs, consistency proof references, revocation references).

Key-Status Record. A signed statement indicating status of a signing key (e.g., active, rotated, expired, revoked) and related metadata (e.g., key identifier and validity interval). In some embodiments, a key-status commitment derived from a key-status record is anchored in a CVL/TGEL for verifier consumption.

Manifest Commitment. A commitment derived from a signed policy manifest, such as a cryptographic digest of a canonical encoding of the signed policy manifest. In some embodiments, a manifest commitment is anchored in a CVL/TGEL and referenced by permit engines, verifiers, receipts, or SP-F records.

Manifest Evidence Reference. An evidence reference sufficient to support independent verification that a manifest commitment is anchored in a CVL/TGEL. In some embodiments, a manifest evidence reference includes at least a signed head identifier and an inclusion proof reference, and optionally a consistency proof reference and freshness metadata.

Policy Admission Controller. A component that performs pre-use admission of a policy pack for use by a permit engine by verifying manifest anchoring and, in some embodiments, executing conformance test vectors to compare observed outcomes to expected outcomes. In some embodiments, admission failure maps to fail-closed denial and a machine-verifiable failure record.

Policy Distribution Bundle. A bundle distributed to relying parties that includes at least a signed policy manifest and a manifest evidence reference, and, in some embodiments, a conformance pack, certification results, revocation metadata, and/or key-status records.

Policy Governance Service. A service (e.g., policy governance service 700) that generates and/or distributes policy supply-chain artifacts. In some embodiments, the service produces a signed policy manifest, manifest commitments anchored in a CVL/TGEL, conformance packs, certification results, and policy revocation events.

Procurement-Ready Compliance Artifact. A packaged artifact suitable for procurement, audit, or regulatory submission. In some embodiments, it includes or references a verification report, deterministic reason codes bound to a registry version, and machine-verifiable evidence references.

Signed Policy Manifest. A signed statement (e.g., signed policy manifest 712) describing a policy pack identifier and version, a policy digest, a canonicalization identifier, and, in some embodiments, a compiler measurement digest and overlay composition semantics. In some embodiments, a manifest commitment derived from the signed policy manifest is anchored in a CVL/TGEL.

Verification Report. A verifier-produced report that includes at least a verification determination, deterministic reason codes (optionally bound to a reason-code registry version), and evidence references sufficient to support replay verification. In some embodiments, the verification report is used for procurement, audit, dispute, or oversight workflows.

Relying Party. A party or system that consumes one or more of receipts, permits, manifests, proofs, or verification reports to make an access, execution, or procurement decision. In some embodiments, relying parties include actuation gates, permit engines, procurement authorities, auditors, or regulators.

Policy Authority. An entity (person, organization, service, or quorum) that controls or authorizes signing keys used for policy manifests, policy packs, or related governance artifacts. In some embodiments, a policy authority publishes key-status records and revocation events.

Overlay Composition Semantics Digest. A commitment (e.g., digest) to composition semantics for combining a primary policy layer with one or more overlay layers. In some embodiments, the digest is included in a signed policy manifest and used to enable replay-verifiable interpretation of overlay composition.

Controlled Record System. A system of record or authoritative datastore that persists, publishes, or finalizes state associated with an operation request or outcome, including without limitation an electronic record system, account ledger, transaction system, authorization directory, content publication system, configuration store, or other record-keeping system. In some embodiments, a controlled record system exposes a write-back path or finalization interface that is treated as an actuation surface and is prevented by default absent a verified permit and applicable proof artifacts. Decision-Support Interface (DSI). A user-facing or machine-facing interface that renders, finalizes, or commits a decision, recommendation, determination, or action proposal for an operation request. In some embodiments, a DSI includes a finalization control (e.g., commit, approve, publish, submit, write-back) whose invocation is treated as actuation and is gated by fail-closed permit-before-actuate semantics.

Idempotency Mechanism. A control mechanism that prevents duplicate, partial, or split-brain finalization of an actuation across retries, races, or concurrent attempts. In some embodiments, an idempotency mechanism comprises at least one of: an idempotency key, a transaction fence, a compare-and-swap (CAS)-based commit marker, a write-ahead-log (WAL) barrier, a sequence-number fence, or a functionally equivalent mechanism. In some embodiments, violations of idempotency constraints map to fail-closed denial and emission of an SP-F record.

Commit Marker. A persistent or verifiable indicator used to enforce atomic finalization and idempotency for an operation request. In some embodiments, a commit marker comprises at least one of a CAS-stored state flag, a monotonic commit epoch, a transaction identifier, a WAL record pointer, or a signed finalization artifact. In some embodiments, a commit marker is bound to at least one of a receipt commitment, token identifier, anti-replay tuple, or token scope to prevent reuse across gates or contexts.

Content-Authenticity Credential. A credential, manifest, claim set, or other verifier-consumable artifact that provides evidence of origin, integrity, capture context, or authorized processing for media or sensor-derived content, including without limitation cryptographic signatures, attestations, signed metadata, watermark credentials, transparency-log references, or functionally equivalent authenticity artifacts.

Provenance Artifact. A record, manifest, receipt, or chain of evidence describing origin, transformations, custody, approvals, or processing lineage for data or content, including without limitation provenance records, signed processing steps, audit trails, capture logs, transformation manifests, or functionally equivalent lineage artifacts suitable for independent verification.

Authenticity Signal. Any signal, indicator, credential reference, or proof element used to evaluate authenticity, integrity, or non-manipulation of an evidence item or evidence bundle, including without limitation provenance artifacts, attested capture metadata, corroboration results, watermark credentials, secure-capture claims, and/or outputs of detection or verification procedures, without requiring any particular algorithm or format.

Context Field Inclusion Manifest. A deterministic, replay-verifiable representation that identifies which context fields, metadata fields, and/or derived fields were included in a canonicalized representation used to compute a canonical context digest. In some embodiments, the inclusion manifest is itself canonicalized under a context label and is referenced or committed by a receipt, tribunal packet, or verification report.

context_field_list_digest. A cryptographic digest computed over a deterministic canonical encoding of a Context Field Inclusion Manifest. In some embodiments, the context_field_list_digest is included in, or committed by, a ReceiptCore and/or is recomputed by a verifier using one or more upstream system logs to confirm that evaluation, receipt issuance, and permit issuance corresponded to the canonicalized context as represented by the context_field_list_digest.

Compute-Admission Action. An informational actuation or pre-effect admission or enablement action that makes compute work or accelerator work executable or materially consequential, including without limitation one or more of enqueue, job admission, kernel launch, DMA enablement, memory-mapping enablement, mediated-device enablement, virtual-function enablement, scheduler admission, quota/budget admission, or functionally equivalent pre-effect enablement actions.

Privileged Tool or API Invocation. An informational actuation comprising an invocation of a tool, function, or application programming interface (API)—whether initiated by a human, software, or an autonomous or semi-autonomous agent—that can cause or enable a high-stakes effect, including without limitation external side effects such as transactions, account changes, data access or modification, device control, workflow execution, network actions, or other materially consequential actions.

Data-Release or Disclosure Action. An informational actuation comprising publishing, transmitting, exporting, sharing, disclosing, or otherwise releasing data, outputs, model results, or derived artifacts to a party, channel, system, or environment, including without limitation write-back to a controlled record system, content publication, report generation and delivery, data export, cross-domain replication, or functionally equivalent disclosure actions, where such release may be safety-critical, privacy-critical, security-critical, or otherwise high-stakes.

Appendix B—Deterministic Reason-Code Registry
(Illustrative; Non-Limiting)

This appendix provides illustrative, non-limiting examples of deterministic reason codes that may be used for PoPC outcomes and/or SP-F records. Reason codes may be extended, renamed, versioned, or composed in other embodiments. Unless expressly recited in the claims, the examples herein do not restrict claim scope.

In some embodiments, reason codes are governed by a versioned Reason-Code Registry (RCR) that is independently verifiable. By way of example, an RCR may be represented by a registry manifest comprising at least: (i) a registry_id, (ii) a registry_version, (iii) a registry_digest derived from a canonical encoding of registry entries, and (iv) an optional registry signature or signature reference. In some embodiments, a commitment derived from the registry_digest is anchored in a CVL/TGEL, and verifiers validate the registry_digest using inclusion and (when applicable) consistency proof artifacts.

In some embodiments, each reason code has deterministic semantics and maps to a deterministic disposition selected from {PASS, HOLD, DENY}. In some embodiments, reason codes additionally map to one or more of: a severity tier, an operator action hint, a retriable flag, and a hold_deadline or retry_after_ms value (where applicable), without limitation.

Coding/encoding (illustrative). In some embodiments, each reason code has: (i) a stable string identifier (reason_code_id) (e.g., a namespaced identifier), and optionally (ii) a numeric identifier (reason_code_int) for compact encoding. In some embodiments, a canonical encoding rule set defines how reason codes and associated metadata are serialized to ensure deterministic hashing and replay-verifiable interpretation.

Deterministic ordering and composition. In some embodiments, multiple reason codes may be emitted for a single decision. In some embodiments, a primary_reason_code is selected deterministically (e.g., by a precedence table) and secondary_reason_codes are sorted deterministically (e.g., lexicographic by reason_code_id). In some embodiments, composition includes de-duplication and stable ordering rules to prevent ambiguity across implementations.

Unknown or unrecognized codes. In some embodiments, if a verifier encounters an unknown reason_code_id or a registry mismatch (e.g., registry_digest mismatch), the verifier treats the outcome as HOLD and then DENY by expiration absent a verified registry manifest satisfying freshness and trust-anchor requirements, thereby preserving fail-closed behavior.

Binding to receipts and failure records. In some embodiments, PoPC receipts and/or SP-F records bind to a reason-code registry version by including at least one of: registry_id, registry_version, registry_digest, and/or a registry signature reference, enabling independent parties to interpret reason codes replay-verifiably.

Evidence references (illustrative). In some embodiments, each SP-F or verification report that includes reason codes also includes an evidence_ref identifying artifacts sufficient to support replay verification (e.g., signed head identifiers, inclusion/consistency proof references, receipt commitment references, manifest references, revocation references), without limitation.

Extension policy (illustrative). In some embodiments, reason codes are namespaced such that vendor-, tenant-, or domain-specific extensions do not collide with baseline identifiers. In some embodiments, reserved ranges or prefixes are defined for private extensions while preserving deterministic semantics for baseline codes.

PASS. Policy evaluation succeeded and preconditions for actuation were satisfied. Disposition: PASS.

FAIL_POLICY_DENY. Policy evaluation resulted in a denial outcome under the applicable policy pack and any overlay constraints. Disposition: DENY.

FAIL_EVIDENCE_MISSING. One or more required evidence items or bundles were missing or unavailable. Disposition: DENY (or HOLD in some embodiments where evidence acquisition is permitted within a bounded window).

FAIL_EVIDENCE_STALE. One or more evidence items or bundles failed a freshness bound. Disposition: DENY (or HOLD pending refreshed evidence within a bounded window).

FAIL_DIVERSITY_THRESHOLD. Evidence diversity or corroboration requirements were not satisfied. Disposition: DENY.

FAIL_ATTESTATION_INVALID. Attestation evidence was missing, invalid, or did not match an expected measurement. Disposition: DENY (or HOLD in some embodiments pending attestation refresh within a bounded window).

FAIL_PROOF_INVALID. A required inclusion proof, consistency proof, witness checkpoint, or other required proof artifact was missing or invalid. Disposition: DENY (or HOLD when a bounded acquisition window applies).

FAIL_HEAD_STALE. A signed head was outside an acceptable freshness bound or MMD policy. Disposition: HOLD (and then DENY by expiration) or DENY, depending on policy.

FAIL_TOKEN_EXPIRED. A permit token was expired or outside a validity interval. Disposition: DENY.

FAIL_TOKEN_SCOPE. Token scope constraints did not match the requested actuation envelope. Disposition: DENY.

FAIL_REVOKED. A token, receipt, credential, approval, policy pack version, signing key, or other privilege was revoked. Disposition: DENY.

FAIL_REPLAY. Anti-replay checks indicated reuse, counter regression, or concurrent reuse. Disposition: DENY.

FAIL_CONTEXT_LABEL_MISMATCH. Context label binding did not match an expected label or domain-separation label. Disposition: DENY.

HOLD_PROOF_PENDING. A hold condition was issued pending proof availability within a bounded window. Disposition: HOLD.

HOLD_FRESHNESS_PENDING. A hold condition was issued pending freshness satisfaction or refreshed evidence within a bounded window. Disposition: HOLD.

HOLD_EXPIRED. A hold condition expired without satisfying preconditions, resulting in denial. Disposition: DENY.

FAIL_REGISTRY_MISMATCH. A reason-code registry identifier, version, digest, or signature reference did not verify, or a required registry manifest could not be validated under freshness constraints. Disposition: HOLD (and then DENY by expiration) or DENY, depending on policy.

FAIL_MANIFEST_UNVERIFIED. A required manifest evidence reference (e.g., policy manifest commitment or proof policy manifest) was missing or could not be verified under required inclusion/consistency/freshness constraints. Disposition: DENY (or HOLD pending proof availability).

FAIL_CONFORMANCE_MISMATCH. Deterministic conformance checks (e.g., test vectors and expected outcomes) failed, indicating a policy pack, compiler, policy VM, or canonicalization mismatch. Disposition: DENY.

FAIL_POLICY_PACK_UNADMITTED. A policy pack was not admitted for use because required pre-use admission checks did not complete successfully. Disposition: DENY.

FAIL_KEY_STATUS_INVALID. A key-status record required to validate a signing key (e.g., policy authority key, log operator key, witness key) was missing, stale, revoked, or did not verify. Disposition: HOLD (and then DENY) or DENY.

FAIL_PARTITION_MISMATCH. A partition identifier or environment identifier (e.g., test vs operational) mismatched an expected partition for the operation. Disposition: DENY.

FAIL_OVERLAY_COMPOSITION_MISMATCH. Overlay composition semantics or a composition digest did not match an expected composition policy for the operation class or stakeholder domain. Disposition: DENY.

HOLD_POLICY_PACK_PENDING. A hold condition was issued pending completion of policy pack admission, certification, or manifest proof acquisition within a bounded window. Disposition: HOLD (and then DENY by expiration).

Appendix C—Example Receipt Structures
(Illustrative; Non-Limiting)

This appendix provides illustrative, non-limiting examples of receipt fields and encodings. In other embodiments, receipts may include fewer fields, additional fields, alternative encodings, or equivalent commitments, without limitation. Unless expressly recited in the claims, the examples herein do not restrict claim scope.

Canonical receipt encoding (illustrative). In some embodiments, a receipt (or receipt subset) is serialized using deterministic canonicalization rules (including a canonicalization identifier and context label) such that independent parties can reproduce identical digests. In some embodiments, receipts are signed using one or more signing keys referenced by key identifiers and validated using key-status records and trust anchors.

Receipt versioning (illustrative). In some embodiments, a receipt includes a receipt_schema_id and receipt_schema_version. In some embodiments, schema identifiers and versions are bound into a receipt commitment and/or referenced in a tribunal packet to support replay-verifiable interpretation.

Receipt evidence references (illustrative). In some embodiments, receipts include evidence_ref fields that identify proof artifacts sufficient for replay verification, including without limitation: signed head identifiers, inclusion proof references, consistency proof references, witness checkpoint references, revocation references, policy manifest references, or reason-code registry references.

In some embodiments, a ReceiptCore includes fields such as: (a) receipt_id; (b) issued_at; (c) policy_pack_id and version; (d) policy_pack_digest; (e) overlay identifiers or digests; (f) context_label; (g) canonical_context_digest; (h) evidence_commitments; (i) evidence_freshness_commitments; (j) outcome; (k) reason_codes; (l) accountable_principal; (m) approval_commitments; (n) validity_constraints; (o) attestation_ref and/or attestation_digest; and (p) optional selective-disclosure segments and anti-replay correlation fields.

Anti-replay correlation (illustrative). In some embodiments, a receipt includes at least one of: a nonce, a monotonic counter, a sequence number, or a concurrency-prevention tuple, enabling correlation between receipt issuance, permit minting, and time-of-use enforcement without revealing restricted fields.

Overlay composition binding (illustrative). In some embodiments, a receipt includes an overlay_composition_semantics_digest and/or overlay_layer_digests that bind the receipt to composition semantics used for combining a primary policy layer with one or more overlay layers.

Policy supply-chain references (illustrative). In some embodiments, a receipt includes one or more policy manifest references including at least one of: a policy manifest identifier, a manifest commitment, a manifest evidence reference, a policy compiler measurement digest, a conformance pack identifier, or a certification commitment reference, enabling an independent verifier to validate that the policy pack used for evaluation corresponds to an anchored and admitted policy pack.

Reason-code registry binding (illustrative). In some embodiments, a receipt includes one or more of: a reason-code registry identifier, registry version, registry digest, or registry signature reference, enabling replay-verifiable interpretation of reason_codes.

In some embodiments, a Minimal ReceiptCore omits sensitive details while preserving fields sufficient to support independent verification of anchoring, scope binding, and time validity. For example, a Minimal ReceiptCore may include: (a) receipt_id; (b) issued_at; (c) policy_pack_id and version; (d) policy_pack_digest; (e) canonical_context_digest; (f) outcome and reason_codes; (g) validity_constraints; and (h) references or commitments sufficient to derive a receipt commitment anchored in a CVL/TGEL.

Selective disclosure and redaction (illustrative). In some embodiments, a redaction map defines which receipt fields are disclosable to which verifier classes, and a Minimal ReceiptCore is constructed deterministically from the ReceiptCore according to the redaction map. In some embodiments, a verifier confirms inclusion/consistency/ freshness and scope binding without access to redacted fields.

Minimal receipt proof segments (illustrative). In some embodiments, a Minimal ReceiptCore includes or references at least one privacy-preserving proof segment (including a zero-knowledge proof) that attests to satisfaction of at least one predicate without revealing restricted evidence.

In some embodiments, the receipt commitment is derived from a Minimal ReceiptCore using a deterministic commitment function. Alternative commitment schemes may be used in other embodiments.

Commitment domain separation (illustrative). In some embodiments, the deterministic commitment function is domain-separated by a context label and/or a commitment-purpose label (e.g., "receipt_commitment/v1"), such that mismatched domain separation maps to fail-closed denial or verification failure.

Appendix D—Example Permit Token and Scope Envelope (Illustrative; Non-Limiting)

This appendix provides illustrative, non-limiting examples of fields that may be included in a scoped permit token and token scope envelope. Other embodiments may encode equivalent information using different fields or structures.

Token encoding and versioning (illustrative). In some embodiments, a permit token includes a token_schema_id and token_schema_version and is serialized using deterministic canonicalization rules to support reproducible verification. In some embodiments, permit tokens are signed and validated using trust anchors and key-status records.

In some embodiments, a scoped permit token is crypto-graphically bound to: (a) a receipt commitment; (b) a token_scope describing an allowed actuation envelope; (c) a gate_id identifying an actuation gate or gate class; and (d) an audience identifier for an intended relying party. In some embodiments, the token further includes one or more of: a token identifier, an anti-replay tuple (e.g., nonce and/or monotonic counter), a validity interval, a refresh window, a revocation pointer, and a domain-separation label.

Context label/purpose binding (illustrative). In some embodiments, a permit token is cryptographically bound to at least one of a context label or a token-purpose domain-separation label, and a mismatch maps to fail-closed denial and emission of an SP-F record.

Lease and refresh (illustrative). In some embodiments, token validity is implemented as a lease requiring refresh within a refresh window, and failure to refresh maps to HOLD and then DENY by expiration absent satisfaction of verification conditions.

Anti-replay tuple semantics (illustrative). In some embodiments, the anti-replay tuple comprises a nonce and a monotonic counter forming a concurrency-prevention tuple, and reuse, counter regression, or concurrent reuse maps to fail-closed denial.

In some embodiments, token_scope includes one or more constraints such as: (a) operation_class; (b) effect_type; (c) bounded_region identifiers; (d) a time_window; (e) parameter envelope constraints; (f) target or resource identifiers or classes; (g) required approvals or quorum predicates; and (h) optional rate limits or concurrency limits. In other embodiments, token_scope may include additional or fewer constraints.

Scope evaluation (illustrative). In some embodiments, scope constraints are evaluated deterministically and violations map to FAIL_TOKEN_SCOPE, and the token_scope includes evidence references or commitments sufficient to support replay-verifiable interpretation.

Multi-log proof policy reference (illustrative). In some embodiments, a permit token includes or references a proof policy manifest identifier or digest specifying multi-log and witness proof requirements, and the actuation gate denies actuation absent satisfaction of the referenced proof policy.

Appendix E—Example Log Proof Artifacts and Continuity Records (Illustrative; Non-Limiting)

This appendix provides illustrative, non-limiting examples of proof artifacts that may be produced by a CVL/TGEL and consumed by verifiers, gates, and relying parties.

Signed-head structure (illustrative). In some embodiments, a signed head is represented as a signed statement including at least: signed_head_id, log_id, head_timestamp, and a staleness interval. In some embodiments, signed heads also include a signing_key_id, a rotation_epoch, and optional witness checkpoint references or cosignatures.

In some embodiments, a signed head includes: (a) a signed_head_id; (b) a log_id; (c) a head timestamp; (d) a staleness interval or freshness interval; (e) a commitment to a log state; and (f) optional witness checkpoint references or cosignatures.

Inclusion proof structure (illustrative). In some embodiments, an inclusion proof includes: (i) a leaf commitment (e.g., receipt commitment or failure commitment), (ii) a set of sibling hashes or equivalent membership proof data, and (iii) a reference to the signed head under which inclusion is asserted.

In some embodiments, an inclusion proof proves inclusion of a receipt commitment (or failure commitment) under a signed head. In some embodiments, a consistency proof proves that a newer signed head extends an older signed head in an append-only manner. In other embodiments, equivalent proofs may be used.

Consistency verification (illustrative). In some embodiments, reliance on a newer signed head requires verification of a consistency proof linking a previously observed signed head to the newer signed head, and failure to verify maps to FAIL_PROOF_INVALID and/or a continuity failure condition.

In some embodiments, a continuity record maintained by a verifier includes: (a) observed signed heads; (b) verified consistency relationships; (c) optional witness checkpoints; and (d) one or more detection rules for equivocation, roll-back, or fork conditions, resulting in fail-closed denial or hold as configured.

Equivocation defense (illustrative). In some embodiments, equivocation defense is strengthened using one or more of witness cosignatures, witness checkpoints, verifier gossip, cross-log checkpointing, and multi-verifier continuity records, and detected equivocation maps to HOLD and then DENY absent resolution within a bounded window.

Appendix F—Policy Packs, Overlays, and Composition Semantics (Illustrative; Non-Limiting)

This appendix provides illustrative, non-limiting examples of policy pack structure and overlay composition semantics. Policy packs may be implemented using rules, models, parameters, or hybrids, and may be packaged in any portable format.

Policy pack supply-chain posture (illustrative). In some embodiments, policy packs are treated as governed artifacts and are distributed with manifest evidence references, conformance packs, certification results, and revocation metadata, enabling independent verification that a policy pack used for evaluation corresponds to an admitted and anchored policy pack version.

In some embodiments, a policy pack includes: (a) a policy pack identifier; (b) a version tag; (c) one or more policy modules; (d) optional compilation outputs (e.g., deterministic predicates for a policy VM); and (e) provenance and approval metadata. In some embodiments, policy packs are signed and/or attested by an issuing authority.

Policy manifest and measurement binding (illustrative). In some embodiments, a signed policy manifest includes: policy pack_id, policy_pack_version, policy_digest, canonicalization identifier (including context label), and a compiler measurement digest derived from attestation evidence or signed build provenance for a policy pack compiler and/or policy VM.

Conformance pack (illustrative). In some embodiments, a conformance pack includes deterministic test vectors and expected outcomes for execution of deterministic predicates under a canonicalization identifier, and optionally includes expected trace commitments, enabling independent verification of deterministic behavior.

Pre-use admission (illustrative). In some embodiments, a relying party or policy admission controller admits a policy pack for use only after verifying manifest inclusion under a sufficiently fresh signed head and confirming conformance outcomes match expected outcomes, and denies admission on mismatch.

In some embodiments, overlay layers supplied by distinct stakeholders are composed using semantics that may include conjunction, disjunction, precedence or override rules, threshold rules, lattice-based constraints, conflict-resolution policies, and/or operation-class-specific composition. In some embodiments, composition semantics are themselves versioned and committed, enabling replay-verifiable recomputation by external verifiers.

Overlay composition digest (illustrative). In some embodiments, an overlay composition semantics digest is included in, or referenced by, a policy manifest, a receipt, or a proof policy manifest, enabling verifiers to confirm which composition rules applied.

Multi-stakeholder approvals (illustrative). In some embodiments, publication of new policy pack versions and/or overlay composition updates is conditioned on k-of-m approvals and approval commitments are bound into a policy manifest, receipt, or certification result.

Policy revocation (illustrative). In some embodiments, policy revocation events for policy pack identifiers/versions and signing keys are anchored in a CVL/TGEL and propagated to caches, and policy revocation is enforced as a precondition to permit minting and/or actuation.

Appendix G—Verifier Kit and Conformance Guidance (Illustrative; Non-Limiting)

This appendix provides illustrative, non-limiting guidance for independent verification and conformance testing. In some embodiments, a verifier kit includes software, documentation, and test vectors enabling independent parties to validate receipts, proofs, and gate behavior.

Verifier kit posture (illustrative). In some embodiments, a verifier kit is designed to be replayable and deterministic, producing the same verification determinations and reason codes given the same disclosed artifacts (Minimal Receipt-Core, manifests, proofs, and registry versions), subject to defined freshness and revocation constraints.

Procurement and audit usage (illustrative). In some embodiments, verifier kit outputs are packaged as procurement-ready compliance artifacts and dispute packets, including evidence references sufficient for independent replay verification.

Example conformance checks (illustrative; non-limiting) may include: (a) fail-closed default behavior absent a valid permit; (b) deterministic canonicalization and digest recomputation; (c) policy pack version and digest binding; (d) inclusion proof verification under a sufficiently fresh signed head; (e) consistency proof verification upon signed head advancement; (f) mint-after-verify token issuance conditions; (g) token scope match and audience or gate binding checks; (h) anti-replay tuple enforcement; (i) time-of-use revalidation for TOCTOU mitigation; (j) revocation enforcement and propagation; and (k) SP-F emission and optional anchoring of denial or hold commitments.

Additional conformance checks (illustrative; non-limiting) may include: (1) verification of reason-code registry identifiers/digests and rejection on registry mismatch; (m) verification of policy manifest inclusion and policy pack admission prior to use; (n) verification of witness requirements when present; (o) multi-log proof policy satisfaction when required; (p) verification of partition identifiers (operational vs test/certification) and denial on mismatch; and (q) verification of key-status and rotation records when present.

Appendix H—Multi-Log Proof Policy Manifest (Illustrative; Non-Limiting)

This appendix provides illustrative, non-limiting examples of a multi-log proof policy schema and manifest that may be used to specify proof satisfaction conditions across a primary log and one or more overlay logs and/or witness logs. The examples herein are not exhaustive and do not restrict claim scope; equivalent schemas, encodings, fields, or validation procedures may be used in other embodiments.

In some embodiments, a multi-log proof policy is represented as a ProofPolicyManifest that is (i) versioned, (ii) optionally signed by an issuing authority, and (iii) referenced, incorporated, or committed into one or more artifacts including, without limitation, a PoPC receipt 172, a receipt commitment 175 derived from a Minimal ReceiptCore 174, a scoped permit token 182, an SP-F record 300, and/or a tribunal packet 400.

In some embodiments, the ProofPolicyManifest is encoding-agnostic and may be expressed using any suitable representation including, without limitation, a structured data object, a compact binary encoding, a signed statement, or a deterministic serialization in formats such as JSON, CBOR, YAML, ASN.1, or equivalents.

In some embodiments, the ProofPolicyManifest includes one or more identifiers and version fields including, without limitation: (a) a manifest_id; (b) a manifest_version; (c) an issuer identifier; (d) an issuance time; (e) a validity interval; (f) a trust_anchor_set_id referencing an applicable trust anchor set; and (g) an optional manifest_digest and/or issuer signature.

In some embodiments, the ProofPolicyManifest includes a log set specification identifying one or more required and/or optional logs. By way of example, a log entry in the log set specification may include: (a) a log_id; (b) a log_role (e.g., primary, overlay, witness, regulator, auditor); (c) a log_type (e.g., CVL, TGEL, transparency log, checkpointed append-only log); (d) an operator identifier; (e) an acceptable signing key set or key identifier(s); and (f) an optional partition_id.

In some embodiments, the ProofPolicyManifest specifies per-log proof requirements, including, without limitation: (a) inclusion verification requirements for receipt commitments 175 and/or failure commitments 306; (b) consistency verification requirements upon signed head advancement; (c) signed head freshness requirements (e.g., head staleness interval constraints); (d) maximum merge delay (MMD) constraints; (e) witness checkpoint 212 or cosignature 214 requirements; and (f) revocation metadata freshness requirements.

In some embodiments, the ProofPolicyManifest defines a composition semantics expression that determines whether multi-log proof satisfaction conditions are met. Composition semantics may include conjunction (AND), disjunction (OR), k-of-n threshold rules, precedence or override rules, lattice-based constraints, conflict-resolution policies, and nested or hierarchical compositions, without limitation.

In some embodiments, composition semantics are parameterized by operation class, risk classification, effect type, jurisdiction, stakeholder class, gate class, or other selectors. For example, a manifest may specify stricter multi-log constraints for higher-risk operation classes and looser constraints for lower-risk operation classes.

In some embodiments, a multi-log proof policy includes one or more proof bundles, each proof bundle describing the minimal set of artifacts sufficient to support independent verification. For example, a proof bundle may include: (a) a signed head identifier for each required log; (b) an inclusion proof 206 for each required log; (c) a consistency proof reference 208 when a newer signed head is relied upon; (d) optional witness checkpoint references; and (e) optional revocation references.

In some embodiments, a ProofPolicyManifest includes one or more canonicalization rules or references to canonicalization rules such that proof policy interpretation is deterministic and replay-verifiable. For example, the manifest may include a policy_domain_label or domain-separation label that is included in or committed by manifest serialization.

In some embodiments, the ProofPolicyManifest specifies failure handling behavior as illustrative outcomes, including, without limitation: (a) HOLD when a proof is pending within a bounded window; (b) DENY when a required proof cannot be obtained or verified; and (c) fail-closed behavior such that no scoped permit token 182 is minted and the actuation gate 190 remains disabled absent proof satisfaction.

Example Manifest Structure (illustrative; non-limiting). In some embodiments, a manifest includes fields such as: (a)

manifest_id; (b) manifest_version; (c) trust_anchor_set_id; (d) log_set entries each with log_id, log_role, partition_id, and proof requirements; (e) policy_selectors (e.g., operation_class, risk_class); (f) composition_expression (e.g., AND (primary, overlay1, overlay2), or k-of-n (overlays, k)); (g) freshness policies (e.g., per-log MMD bounds); and (h) optional witness requirements.

Example AND Policy (illustrative; non-limiting). In some embodiments, for an operation_class designated as "HIGH_STAKES," the manifest may require that the receipt commitment 175 be included under sufficiently fresh signed heads 204 for (i) a primary log and (ii) at least one regulator overlay log, and that each relied-upon signed head advancement be validated via a consistency proof 208.

Example k-of-n Policy (illustrative; non-limiting). In some embodiments, for an operation_class designated as "ELEVATED," the manifest may require inclusion proofs under a primary log and satisfaction of at least k overlay logs out of n, with overlay logs representing independent stakeholder domains.

Example Precedence Policy (illustrative; non-limiting). In some embodiments, a precedence rule may require that if any overlay log with log_role "regulator" indicates a denial artifact or revocation artifact bound to the operation request 112, the effective outcome is denial, regardless of primary log inclusion for a compliant receipt.

In some embodiments, a ProofPolicyManifest is itself committed into artifacts by including a manifest identifier and/or manifest digest in a receipt 172, Minimal Receipt-Core 174, receipt commitment 175, permit token 182, or SP-F record 300, thereby enabling independent verification that a relying party applied an expected multi-log proof policy.

In some embodiments, when a multi-log proof policy is not satisfied, the system emits an SP-F record 300 that includes a reason code (e.g., FAIL_PROOF_INVALID, FAIL_HEAD_STALE, FAIL_REVOKED, HOLD_PROOF_PENDING) and includes evidence ref fields that reference the missing or invalid artifacts (e.g., a missing signed head identifier, missing inclusion proof, or inconsistent continuity record), without limitation.

The examples described herein may be extended, reduced, or modified in other embodiments without limitation, and the claims control.

Appendix I—Federation Trust Anchors, Log Identifiers, and Key Rotation (Illustrative; Non-Limiting)

This appendix provides illustrative, non-limiting examples of federation trust anchor models, log identifier structures, and key-rotation procedures that may be used with CVLs/TGELs 200 in multi-organization deployments. The examples herein are not exhaustive and do not restrict claim scope; equivalent trust models, identifiers, and rotation procedures may be used in other embodiments.

In some embodiments, federation trust is expressed using one or more trust anchor sets (TAS), each trust anchor set including one or more root or quorum trust anchors associated with stakeholder domains. A trust anchor may include, without limitation, a root public key, a certificate authority root, a quorum public key set, a threshold signature public key, or an attested identity binding.

In some embodiments, each log has a log_id that uniquely identifies a log instance across domains. A log_id may include, without limitation: (a) an operator identifier; (b) a domain identifier; (c) an environment identifier (e.g., production, certification, test); (d) a partition identifier; and/or (e) a version tag. In some embodiments, a log_id is bound into signed heads 204 and/or into issuer signatures for signed heads 204.

In some embodiments, a trust anchor set includes key usage constraints, such as which keys may sign signed heads 204 for which log_ids, and which keys may sign ProofPolicyManifests or other governance artifacts.

In some embodiments, keys are rotated using a key rotation record that is itself verifiable. For example, a key rotation record may be: (a) signed by an existing authorized key; (b) optionally co-signed by one or more witnesses; and (c) anchored to a CVL/TGEL 200 as a rotation commitment, enabling independent verification that a new key is authorized to sign subsequent signed heads 204.

In some embodiments, signed heads 204 include a signing_key_id and/or a rotation_epoch identifier, and verifiers 210 validate that the signing key is authorized for the corresponding log_id under the applicable trust anchor set and rotation epoch.

In some embodiments, revocation is supported for at least one of: (a) a signing key; (b) a trust anchor; (c) a witness key; (d) a manifest issuer; (e) a log operator; or (f) a partition. Revocation may be represented by a revocation event 188 anchored to a CVL/TGEL 200 or distributed via a revocation channel, and enforced via freshness-bounded revocation checks at a verifier 210 and/or actuation gate 190.

In some embodiments, federation includes cross-signing or checkpointing, in which one log publishes checkpoints of another log's signed heads (e.g., by anchoring the other log's signed head identifier in the publishing log), thereby strengthening equivocation detection across domains.

In some embodiments, witness checkpoints 212 or cosignatures 214 are used to reduce reliance on a single operator and to increase global verifiability. For example, a signed head 204 may be treated as sufficiently strong only when accompanied by at least k witness cosignatures from independent witness domains, and such witness requirements may be specified in a ProofPolicyManifest.

In some embodiments, trust anchors and rotation records are partitioned by environment and by purpose, such that production actuation permits cannot be satisfied by test or certification logs. For example, a partition_id may be bound into signed heads 204, receipts 172, and permit tokens 182, and a mismatch between an expected partition_id and a committed partition_id maps to fail-closed denial and an SP-F record 300.

In some embodiments, verifiers 210 maintain a continuity record 216 that includes: (a) observed signed heads; (b) verified consistency relationships; (c) observed key rotation epochs; and (d) observed trust anchor set identifiers. In some embodiments, inconsistent rotation epochs, unexpected trust anchor changes, or missing rotation records map to HOLD or DENY outcomes and prevent minting or acceptance of a scoped permit token 182.

In some embodiments, caches are used for trust anchors and revocation metadata, and such caches are freshness-bounded. Failure to obtain sufficiently fresh trust anchor information or revocation metadata within a configured bound may map to HOLD and then to DENY, without limitation.

The examples described herein may be extended, reduced, or modified in other embodiments without limitation, and the claims control.

Appendix J—Verifier Kit Conformance Vectors (Illustrative; Non-Limiting)

This appendix provides illustrative, non-limiting conformance vectors that may be used by an independent verifier kit to validate interoperability, replay verification, and fail-closed enforcement for the disclosed embodiments. The vectors herein are not exhaustive and do not restrict claim scope; equivalent vectors, encodings, and expected outcomes may be used in other embodiments.

In some embodiments, a conformance vector includes: (a) an operation request description (including operation_class, risk_class, and token_scope expectations); (b) canonicalization inputs and expected canonical context digest 116; (c) evidence bundle commitments 144 and freshness commitments 146; (d) policy pack identifiers and digests; (e) attestation references; (f) signed heads 204 and proof artifacts (inclusion proofs 206, consistency proof references 208); (g) revocation state; and (h) expected verifier outcomes and expected reason codes.

In some embodiments, conformance vectors are deterministic and replayable. For example, a verifier kit may include test vectors that specify fixed canonicalization rules and fixed policy pack digests such that independent recomputation yields identical expected digests and outcomes.

Vector V1—Single-Log PASS (illustrative; non-limiting). Inputs include a valid ReceiptCore 173 and Minimal ReceiptCore 174, a receipt commitment 175, an inclusion proof 206 under a sufficiently fresh signed head 204, and no revocation. Expected result: PASS; scoped permit token 182 may be accepted at the actuation gate 190 when token_scope matches and TOCTOU checks succeed.

Vector V2—Multi-Log AND PASS (illustrative; non-limiting). Inputs include inclusion proofs under a primary log and one overlay log, each under sufficiently fresh signed heads, and consistency verification upon head advancement. Expected result: PASS; permit issuance is allowed only after both logs satisfy the manifest's AND condition.

Vector V3—k-of-n PASS (illustrative; non-limiting). Inputs include a manifest requiring primary+k of n overlays, and proofs satisfying primary plus at least k overlays. Expected result: PASS.

Vector V4—Missing Overlay Proof→HOLD (illustrative; non-limiting). Inputs satisfy primary inclusion but omit a required overlay inclusion proof. Expected result: HOLD_PROOF_PENDING (or FAIL_PROOF_INVALID depending on policy), and actuation remains fail-closed.

Vector V5—Stale Signed Head→DENY (illustrative; non-limiting). Inputs include inclusion proof under a signed head that violates freshness bounds or an MMD bound. Expected result: FAIL_HEAD_STALE (or HOLD_FRESHNESS_PENDING if a bounded window remains), and actuation remains fail-closed.

Vector V6—Consistency Proof Failure→DENY (illustrative; non-limiting). Inputs include reliance on a newer signed head without a valid consistency proof linking to a previously observed signed head. Expected result: FAIL_PROOF_INVALID and/or a continuity failure condition; actuation remains fail-closed.

Vector V7—Witness Requirement Not Met→DENY (illustrative; non-limiting). Inputs include a manifest requiring k witness cosignatures, but only fewer than k cosignatures are provided. Expected result: FAIL_PROOF_INVALID (or a witness-specific reason code extension); no token minting and fail-closed at the gate.

Vector V8—Token Scope Mismatch→DENY (illustrative; non-limiting). Inputs include a valid receipt and proofs but token_scope does not match the requested actuation envelope (e.g., mismatched bounded_region, time_window, or effect_type). Expected result: FAIL_TOKEN SCOPE and actuation remains fail-closed.

Vector V9—Replay Detected→DENY (illustrative; non-limiting). Inputs include reuse of a token identifier or anti-replay tuple (nonce/counter) across the same gate_id or within a constrained concurrency window. Expected result: FAIL_REPLAY and actuation remains fail-closed.

Vector V10—Revocation Enforced→DENY (illustrative; non-limiting). Inputs include a revocation event 188 anchored to a CVL/TGEL 200 or provided via a revocation channel, indicating token, receipt commitment, principal credential, or approval commitment revocation. Expected result: FAIL_REVOKED and actuation remains fail-closed.

Vector V11—Partition Mismatch (Test vs O perational)→DENY (illustrative; non-limiting). Inputs include artifacts bound to a test/certification partition_id presented for operational actuation. Expected result: FAIL_POLICY_DENY, FAIL_CONTEXT_LABEL_MIS-MATCH, or an implementation-defined partition mismatch code; actuation remains fail-closed.

Vector V12—Selective Disclosure/Redaction Preserves Verifiability (illustrative; non-limiting). Inputs include a Minimal ReceiptCore and redaction map 402 that omit sensitive fields while preserving commitments and proofs.

recited in the claims. Reason codes referenced herein map to Appendix B (Deterministic Reason-Code Registry) and are not limiting.

Strict deny mode (illustrative; non-limiting). In some embodiments, a strict fail-closed configuration reduces or disables issuance of HOLD dispositions by mapping one or more HOLD_* reason codes (with HOLD disposition) to corresponding FAIL_* reason codes (with DENY disposition). By way of example, in strict deny mode: HOLD_PROOF_PENDING→FAIL PROOF_INVALID, HOLD_FRESHNESS_PENDING→FAIL_HEAD_STALE, and HOLD_POLICY_PACK_PENDING→FAIL_POLICY_PACK_UNADMITTED. This mapping is illustrative and does not limit other embodiments. Reason codes that already have DENY disposition (e.g., HOLD_EX-PIRED) may remain unchanged.

Terms used herein (e.g., signed head, inclusion proof, consistency proof, maximum merge delay (MMD), continuity record, TGEL, and tribunal-grade) have the meanings set forth in Appendix A, unless expressly stated otherwise.

```
//
=============================================================
======
// Configuration / helpers
//
=============================================================
======
```

Expected result: verifier confirms inclusion/consistency/freshness and scope binding without access to redacted fields; PASS if all proof conditions are met.

In some embodiments, conformance vectors include expected SP-F records 300 for denial and hold outcomes, including expected evidence_ref fields referencing missing or invalid artifacts. In some embodiments, conformance vectors further specify expected behavior under bounded windows for HOLD outcomes, including expected transitions from HOLD to DENY upon expiration.

The examples described herein may be extended, reduced, or modified in other embodiments without limitation, and the claims control.

Appendix K—Example Verifier Procedures (Pseudocode) (Illustrative; Non-Limiting)

This appendix provides non-limiting, language-neutral pseudocode illustrating example procedures for canonicalization, commitment derivation, log proof verification, mint-after-verify (MAV) permit issuance, and time-of-use (TOU)

```
Procedure MAP_HOLD_TO_FAIL (reason_code,
    strict_deny):
  if strict_deny==true:
    if   reason_code==HOLD_PROOF_PENDING:
       return FAIL_PROOF_INVALID
    if reason_code==HOLD_FRESHNESS_PENDING:
       return FAIL_HEAD_STALE
    if                            reason
       code==HOLD_POLICY_PACK_PENDING:
       return
FAIL_POLICY_PACK_UNADMITTED
    return reason code
Procedure EMIT_SPF (reason_code, evidence_ref,
    strict_deny):
  rc=MAP_HOLD_TO_FAIL (reason_code, strict_deny)
  //SP-F minimally includes reason_code and evi-
    dence_ref; additional fields may be included in other
    embodiments.
  spf={reason_code: rc, evidence_ref: evidence_ref}
OUTPUT(spf)
return spf
```

```
//
=============================================================
======
// Deterministic canonicalization and commitments
//
=============================================================
======
``` fail-closed actuation gating. The procedures are examples only; steps may be added, omitted, reordered, combined, performed by different components, or implemented using functionally equivalent mechanisms. No specific cryptographic algorithm, data structure, serialization format, attestation technology, or log implementation is required unless

```
Procedure CANONICALIZE_CONTEXT(ctx, canoni-
    cal_rules, context_label):

canon=DeterministicSerialize (ctx, canonical_rules,
    context_label)

return      HASH(canon)//canonical_context_digest
```

Procedure COMMIT_EVIDENCE_BUNDLES(evidence_bundles):
  //Evidence bundles may include freshness metadata, diversity metadata, approvals, provenance, etc.
  if evidence_bundles is missing:
    return {rc: FAIL_EVIDENCE_MISSING, commitments: null}
  commitments=[ ]
  for b in evidence bundles:
    commitments.append(HASH(DeterministicSerialize(b)))
  return {rc: PASS, commitments: commitments}
Procedure DERIVE_RECEIPT_COMMITMENT (min_receipt_core, receipt_rules, commitment_label):
  canon=DeterministicSerialize(min_receipt_core, receipt_rules, commitment_label) return HASH(canon)//receipt_commitment //
==================================================================
// Signed head, inclusion, consistency, freshness
//
==================================================================

Procedure VERIFY_SIGNED_HEAD(signed_head, trust_anchors, key_status_state):
  //Validate signature under trust anchors; optionally validate key status.
  if NOT VerifySignature(signed_head, trust_anchors):
    return FAIL_PROOF_INVALID
  if key_status_state required AND NOT KeyStatusOK (signed_head.signing_key_id, key_status_state):
    return FAIL_KEY_STATUS_INVALID
  return PASS
Procedure VERIFY_INCLUSION(log_id,
  signed_head,
  commitment,
  inclusion_proof,
  trust_anchors,
  key_status_state,
  acquisition_policy):
rc=VERIFY_SIGNED_HEAD(signed_head, trust_anchors, key_status_state)
if rc !=PASS:
  return rc
  //If proof artifacts are temporarily unavailable in some embodiments, a bounded HOLD may be used.
  //"Unavailable" may include temporary network unreachability, cache miss, delayed publication, or similar conditions.
  if inclusion proof is missing OR inclusion_proof is unavailable:
    if BoundedWindowRemaining(acquisition_policy):
      return HOLD_PROOF_PENDING
    return FAIL_PROOF_INVALID
  if NOT VerifyInclusionProof(log_id, signed_head, commitment, inclusion_proof):

return FAIL_PROOF_INVALID
  return PASS
Procedure VERIFY_CONSISTENCY(log_id,
  prev_signed_head,
  new_signed_head,
  consistency proof,
  trust anchors,
  key_status_state,
  acquisition_policy):
rc=VERIFY_SIGNED_HEAD(prev_signed_head, trust_anchors, key_status_state)
if rc !=PASS:
  return rc
rc=VERIFY_SIGNED_HEAD(new_signed_head, trust_anchors, key_status_state)
if rc !=PASS:
  return rc
//If proof artifacts are temporarily unavailable in some embodiments, a bounded HOLD may be used.
if consistency_proof is missing OR consistency_proof is unavailable:
  if BoundedWindowRemaining(acquisition_policy):
    return HOLD_PROOF_PENDING
  return FAIL_PROOF_INVALID
if NOT VerifyConsistencyProof(log_id, prev_signed_head, new_signed_head, consistency_proof):
  return FAIL_PROOF_INVALID
return PASS
Procedure CHECK_FRESHNESS(signed_head, freshness_policy):
  //freshness_policy may include MMD bounds, head staleness bounds, bounded cache staleness, etc.
  if FreshEnough(signed_head, freshness_policy):
    return PASS
  if BoundedWindowRemaining(freshness_policy):
    return HOLD_FRESHNESS_PENDING
  //In other embodiments, HOLD_EXPIRED may be emitted where a prior HOLD_* was issued and a configured deadline elapsed.
  return FAIL_HEAD_STALE
Procedure UPDATE_CONTINUITY_RECORD(continuity_record, signed_head, consistency_proof_ref):
  //continuity_record may store signed_head_id, proof references, verifier signature, witness checkpoints, etc.
  continuity_record.store_signed_head_id(signed_head.signed_head_id)
  if consistency_proof_ref exists:
    continuity_record.store_consistency_ref(consistency_proof_ref)
  return continuity_record

//
==================================================================

-continued

```
// Optional: policy pack admission posture (illustrative; non-limiting)
//
================================================================
======
```

Procedure REQUIRE_POLICY_PACK_ADMITTED
(policy_pack_id,
policy_pack_version,
manifest_evidence_ref,
conformance_result,
partition_id,
admission_policy):
//Optional posture: any subset may be used in other
embodiments,
if admission_policy.requires_manifest AND NOT
ManifestVerified(manifest_evidence_ref):
if BoundedWindowRemaining(admission_policy):
return HOLD_POLICY_PACK_PENDING
return FAIL_MANIFEST_UNVERIFIED
if admission_policy.requires_conformance AND NOT
ConformanceOK(conformance_result):
return FAIL_CONFORMANCE_MISMATCH
if admission_policy.requires_partition AND NOT Par-
titionOK(partition_id, admission_policy.
expected_partition_id):
return FAIL_PARTITION_MISMATCH
if admission_policy.requires_admission_state AND
NOT
PolicyPackAdmitted(policy_pack_id, policy_pack_ver-
sion):
return FAIL_POLICY_PACK_UNADMITTED
if admission_policy.requires_overlay_semantics AND
NOT
OverlayCompositionOK(admission_policy.overlay_se-
mantics):
return FAIL_OVERLAY_COMPOSITION_MIS-
MATCH
return PASS //1) Inclusion verification
rc=VERIFY_INCLUSION(log_id,
signed_head,
receipt_commitment,
inclusion_proof,
trust_anchors,
key_status_state,
acquisition_policy)
if rc !=PASS:
return EMIT_SPF (rc, {log_id, signed_head,
inclusion_proof, receipt_commitment}, strict_deny)
//2) Freshness verification (MMD/staleness bounds)
rc=CHECK_FRESHNESS (signed_head,
freshness_policy)
if rc!=PASS:
return EMIT_SPF(rc, {log_id, signed_head,
receipt_commitment}, strict_deny)
//3) Store current head as previously observed head
UPDATE_CONTINUITY_RECORD(continuity_record,
signed_head, null)
//4) If relying on advancement, verify append-only evo-
lution
if prev_signed_head exists AND IsNewer(signed_head,
prev_signed_head):
rc=VERIFY_CONSISTENCY(log_id,
prev_signed_head,
signed_head,
consistency_proof,
trust_anchors,
key_status_state,
acquisition_policy)
if rc !=PASS:
return EMIT_SPF(rc, {log_id, prev_signed_head,
signed_head, consistency_proof}, strict_deny)
```
//
================================================================
======
// Core: MAV (mint-after-verify) issuance
//
================================================================
======
```

Procedure MAV_MINT_TOKEN(receipt_commitment,
token_scope,
anti_replay,
gate_id,
audience_id,
log_id,
signed_head,
inclusion_proof,
continuity_record,
prev_signed_head,
consistency_proof,
freshness_policy,
trust_anchors,
key_status_state,
acquisition_policy,
strict_deny):

UPDATE_CONTINUITY_RECORD(continuity_re-
cord, signed_head, Ref(consistency_proof))
//5) Mint token only after verification succeeds
token_payload={
receipt_commitment: receipt_commitment,
token_scope: token_scope,
anti_replay: anti_replay,
gate_id: gate_id,
audience_id: audience_id,
exp: ComputeExpiry(freshness_policy)
}
scoped_permit_token=SIGN(token_payload)
return scoped_permit_token

```
//
=====================================================================
======
// Core: TOU (time-of-use) gate check (deny-by-default)
//
=====================================================================
======
```

Procedure TOU_GATE_CHECK_AND_ACTUATE(re-
quest,
scoped_permit_token,
expected_gate_id,
log_id,
tou_signed_head,
tou_inclusion_proof,
freshness_policy,
revocation_state,
trust_anchors,
key_status_state,
acquisition_policy,
strict_deny):
//Gate denies by default; only actuate on PASS
//Token integrity
if NOT VerifyTokenSignature(scoped_permit_token,
    trust_anchors):
    if key_status_state required AND NOT
KeyStatusOK(scoped_permit_token.signing_key_id,
key_status_state):
    return EMIT_SPF(FAIL_KEY_STATUS_INVALID,
        {scoped_permit_token}, strict_deny)
    return EMIT_SPF(FAIL_PROOF_INVALID, {scope-
    d_permit_token}, strict_deny)
if IsExpired(scoped_permit_token):
    return        EMIT_SPF(FAIL_TOKEN_EXPIRED,
        {scoped_permit_token}, strict_deny)
if NOT AntiReplayOK(scoped_permit_token):
    return    EMIT_SPF(FAIL_REPLAY,    {scoped_
    permit_token}, strict_deny)
//Gate binding/scope binding
if    scoped_permit_token.gate_id    exists    AND
    scoped_permit_token.gate_id!=expected_gate_id:
    return            EMIT_SPF(FAIL_TOKEN_SCOPE,
        {expected_gate_id,            scoped_permit_
        token.gate_id}, strict_deny)
if      NOT      ScopeMatch(scoped_permit_token.
    token_scope, request):
    return            EMIT_SPF(FAIL_TOKEN_SCOPE,
        {request,    scoped_permit_token.token_scope},
        strict_deny)
//Context-label binding (if used)
if request.context_label exists AND scoped_permit_to-
    ken.context_label    exists    AND    request.context_
    label !=scoped_permit_token.context_label:
    return EMIT_SPF(FAIL_CONTEXT_LABEL_M-
        ISMATCH,
        {request_context_label:    request.context_label,
            token_context_label:            scoped_permit_
            token.context_label}, strict_deny)
//Revocation
if IsRevoked(scoped_permit_token, revocation_state)
    OR
    IsRevoked(scoped_permit_token.receipt_commit-
        ment, revocation_state):
    return                EMIT_SPF(FAIL_REVOKED,
        {revocation_state}, strict_deny)

//Time-of-use re-verification (TOCTOU mitigation):
    inclusion+freshness under current head
    receipt_commitment=scoped_permit_token.receipt_
        commitment
    rc=VERIFY_INCLUSION (log_id,
        tou_signed_head,
        receipt_commitment,
        tou_inclusion_proof,
        trust_anchors,
        key_status_state,
        acquisition_policy)
if rc!=PASS:
    return EMIT_SPF (rc, {log_id, tou_signed_head,
        tou_inclusion_proof,        receipt_commitment},
        strict_deny)
    rc=CHECK FRESHNESS (tou_signed_head, fresh-
        ness_policy)
if rc!=PASS:
    return EMIT_SPF (rc, {log_id, tou_signed_head,
        receipt_commitment}, strict_deny)
//Optional anti-replay state update after successful
    actuation may be performed in other embodiments.
    ACTUATE( )
    return PASS
    Multi-log and witness strengthening (illustrative; non-
limiting). In some embodiments, MAV_MINT_TOKEN
and/or TOU_GATE_CHECK_AND_ACTUATE require
proof satisfaction under two or more logs and/or witness
checkpoints or cosignatures according to a proof policy
(e.g., AND, OR, k-of-n, precedence). Failures emit SP-F
records with deterministic reason codes and evidence refer-
ences sufficient for replay verification (e.g., FAIL_PROOF_
INVALID,    FAIL_HEAD_STALE,    FAIL_REVOKED,
FAIL_TOKEN_SCOPE), and strict deny mode may be
applied independently per log or per operation class.
    Optional governance and admission posture (illustrative;
non-limiting). In some embodiments, a relying party per-
forms policy pack admission checks before evaluation and/
or before MAV minting. Admission may include verifying
manifest anchoring (FAIL_MANIFEST_UNVERIFIED),
conformance outcomes (FAIL_CONFORMANCE_MIS-
MATCH), admission state (FAIL_POLICY_PACK_UNAD-
MITTED), overlay composition semantics (FAIL_OVER-
LAY_COMPOSITION_MISMATCH), partition alignment
(FAIL_PARTITION_MISMATCH), and key-status valida-
tion (FAIL_KEY_STATUS_INVALID). When bounded
acquisition windows are used, HOLD_POLICY_PACK_
PENDING may be emitted and, if unresolved by a config-
ured deadline, may transition to denial (e.g., HOLD_EX-
PIRED or FAIL_POLICY_PACK_UNADMITTED), with-
out limitation.
    The invention claimed is:
    1. A computer-implemented method for fail-closed per-
mit-before-actuate control of a controlled effector system,
comprising: receiving, by a permit engine, an operation
request associated with a controlled effector and referencing
one or more evidence bundles, the operation request includ-
ing operation context data; deterministically canonicalizing
at least a portion of the operation context data according to deterministic serialization rules to produce a canonical context digest; selecting, based at least in part on the operation context data, a versioned policy pack comprising machine-enforceable policy predicates required for an actuation operation; obtaining the one or more evidence bundles and computing cryptographic commitments to the one or more evidence bundles; executing, within an attested execution environment, a deterministic policy evaluation procedure that evaluates the machine-enforceable policy predicates against (i) the canonical context digest and (ii) the cryptographic commitments to the one or more evidence bundles subject to at least one freshness threshold, and generating an attestation report that binds the deterministic policy evaluation procedure to at least (a) a measurement of the attested execution environment and (b) a digest of the versioned policy pack; in response to the deterministic policy evaluation procedure producing a compliant outcome, generating a proof-of-policy-compliance (PoPC) receipt comprising at least: (i) a policy pack identifier and a policy pack version, (ii) a policy digest, (iii) the canonical context digest, (iv) the cryptographic commitments to the one or more evidence bundles, (v) an evaluation outcome, (vi) an accountable principal identifier, and (vii) a bounded validity interval; deriving a Minimal ReceiptCore from the PoPC receipt and deriving a receipt commitment from at least the Minimal ReceiptCore; submitting the receipt commitment to an append-only continuity-verified log configured to publish signed heads and provide inclusion proofs and consistency proofs; obtaining, from the append-only continuity-verified log, (i) a signed head and (ii) an inclusion proof for the receipt commitment under the signed head; verifying, under a freshness policy comprising a maximum merge delay (MMD) bound that limits a maximum permitted delay between receipt commitment derivation and inclusion under a signed head, that (i) the inclusion proof is valid under the signed head and (ii) the signed head satisfies the freshness policy; storing the signed head in a continuity record as a previously observed signed head; when subsequently relying on a newer signed head than the previously observed signed head stored in the continuity record, verifying a consistency proof linking the previously observed signed head to the newer signed head and updating the continuity record; issuing, via a mint-after-verify (MAV) process, a scoped permit token only after (a) inclusion proof verification succeeds under a signed head satisfying the freshness policy and (b) when relying on a signed head that is newer than the previously observed signed head stored in the continuity record, consistency proof verification succeeds, the scoped permit token being cryptographically bound to at least (i) the receipt commitment, (ii) a token scope describing an allowed actuation envelope, (iii) an anti-replay tuple, and (iv) at least one of an audience identifier identifying an intended relying party or an actuation-gate identifier, and having a bounded token validity interval; enforcing, at an actuation gate configured to deny actuation by default, a fail-closed gating condition by, immediately prior to enabling actuation, (i) validating the scoped permit token including at least signature validity, expiration, anti-replay, scope matching, and revocation status, and (ii) re-verifying, by verifying a time-of-use inclusion proof under a time-of-use signed head satisfying the freshness policy, that the receipt commitment is included under the time-of-use signed head, and enabling actuation only when both (i) and (ii) succeed; and upon any failure of (i) or (ii), denying actuation and outputting a Structured Precondition Failure (SP-F)

record comprising a deterministic reason code and an evidence_ref field identifying one or more proof artifacts relevant to the failure.

2. The method of claim 1, wherein the actuation operation comprises at least one of a physical actuation or an informational actuation comprising an account action, a transaction dispatch, a message dissemination, a network action, a compute-admission action, a privileged tool or API invocation, or a data-release or disclosure action.

3. The method of claim 1, wherein the versioned policy pack comprises a primary policy layer and at least one overlay policy layer controlled by a distinct stakeholder, and wherein the deterministic policy evaluation procedure determines compliance only when the primary policy layer and the at least one overlay policy layer are satisfied in accordance with overlay composition semantics.

4. The method of claim 1, wherein selecting the versioned policy pack comprises compiling the versioned policy pack into deterministic predicates executed by a deterministic policy virtual machine that outputs (i) a deterministic evaluation trace and (ii) deterministic reason codes.

5. The method of claim 1, wherein the bounded token validity interval is implemented as a lease requiring refresh within a refresh window, and wherein failure to refresh causes the actuation gate to output a HOLD disposition that auto-expires to DENY upon reaching a hold deadline absent verification of receipt commitment inclusion under a signed head satisfying the freshness policy.

6. The method of claim 1, wherein the at least one freshness threshold is evaluated using evidence freshness metadata comprising at least a staleness interval, and the deterministic policy evaluation procedure outputs HOLD or DENY when required evidence is stale.

7. The method of claim 1, wherein the attested execution environment comprises at least one of a trusted execution environment (TEE) or a hardware security module (HSM), and the attestation report binds to at least the policy digest and digests of canonicalized inputs.

8. The method of claim 1, wherein the anti-replay tuple comprises a nonce and a monotonic counter that together form a concurrency-prevention tuple, and wherein the actuation gate denies actuation responsive to detecting at least one of nonce reuse, monotonic counter regression, or concurrent reuse for the same token scope or actuation gate.

9. The method of claim 1, wherein deriving the Minimal ReceiptCore comprises producing a redaction map enabling selective disclosure of the Minimal ReceiptCore to a plurality of verifier classes while withholding restricted fields.

10. The method of claim 1, wherein canonicalizing comprises canonicalizing under a context label that is included in, or committed by, the canonicalized representation used to compute the canonical context digest, and wherein the scoped permit token is cryptographically bound to the context label such that a context-label mismatch maps to fail-closed denial at the actuation gate and output of the SP-F record.

11. The method of claim 1, wherein the signed head comprises at least a signed_head_id, a head_timestamp, a staleness_interval, a log_id, and an optional witness_checkpoint_ref.

12. The method of claim 1, wherein verifying that the signed head satisfies the freshness policy comprises determining, based on the head_timestamp and the staleness_interval, that staleness does not exceed a freshness bound.

13. The method of claim 1, wherein updating the continuity record comprises storing at least one of the signed- _head_id, a verified consistency proof reference, or a verifier signature over continuity state.

14. The method of claim 1, further comprising strengthening equivocation defense by validating at least one of a witness cosignature, a witness checkpoint, or a multi-verifier continuity record for the signed head.

15. The method of claim 1, wherein issuing the scoped permit token comprises issuing the scoped permit token from within a trusted compute boundary only after the inclusion proof verification succeeds under the freshness policy.

16. The method of claim 1, wherein the token scope encodes at least an operation class, an operation-parameter envelope, a bounded region constraint, and a time window constraint, and the actuation gate denies actuation upon a scope mismatch.

17. The method of claim 1, wherein the scoped permit token is single-use and is invalidated upon successful actuation by updating anti-replay state at the actuation gate.

18. The method of claim 1, further comprising anchoring a revocation event in the append-only continuity-verified log and enforcing revocation using a revocation propagation graph that maps the revocation event to at least one of affected receipt commitments or affected scoped permit tokens.

19. The method of claim 1, wherein the time-of-use check comprises re-checking token validity, scope constraints, revocation status, and signed head freshness immediately prior to enabling actuation.

20. The method of claim 1, further comprising generating a tribunal packet comprising at least the Minimal Receipt-Core, the receipt commitment, a signed head identifier, an inclusion proof, an attestation reference, and revocation status evidence.

21. The method of claim 1, wherein at least one of the PoPC receipt or a tribunal packet comprises a privacy-preserving proof segment enabling verification of at least one policy predicate without revealing underlying sensitive attributes.

22. The method of claim 1, further comprising providing an offline verifier kit comprising cached signed heads and cached inclusion proofs for a bounded window and verification procedures enabling verification without online connectivity during the bounded window.

23. The method of claim 1, further comprising anchoring the receipt commitment in two or more append-only continuity-verified logs, and issuance of the scoped permit token is conditioned on verification, for each of the two or more append-only continuity-verified logs, of inclusion under a signed head satisfying a corresponding freshness policy.

24. A system for fail-closed permit-before-actuate control of a controlled effector system, comprising: one or more processors; and one or more non-transitory memory devices storing instructions that, when executed by the one or more processors, cause the system to: receive an operation request associated with a controlled effector, the operation request including operation context data and references to one or more evidence bundles; deterministically canonicalize at least a portion of the operation context data to produce a canonical context digest; obtain the one or more evidence bundles and compute cryptographic commitments to the one or more evidence bundles; select a versioned policy pack comprising machine-enforceable policy predicates; evaluate, within an attested execution environment, the machine-enforceable policy predicates against the canonical context digest and the cryptographic commitments to the one or more evidence bundles subject to at least one freshness threshold and produce an attestation report binding the evaluation to at least (i) a measurement of the attested execution environment and (ii) a digest of the versioned policy pack; generate a proof-of-policy-compliance (PoPC) receipt and derive a receipt commitment from at least a Minimal ReceiptCore of the PoPC receipt; obtain, from an append-only continuity-verified log, a signed head and an inclusion proof for the receipt commitment and verify, under a maximum merge delay (MMD) freshness policy, validity of the inclusion proof under a signed head satisfying the MMD freshness policy; store the signed head in a continuity record as a previously observed signed head; upon reliance on a newer signed head than the previously observed signed head stored in the continuity record, verify a consistency proof linking the previously observed signed head to the newer signed head and update the continuity record; issue, via a mint-after-verify (MAV) process and only after (a) inclusion proof verification succeeds under a signed head satisfying the MMD freshness policy and (b) when relying on a signed head that is newer than the previously observed signed head stored in the continuity record, consistency proof verification succeeds, a scoped permit token bound to at least the receipt commitment and a token scope; and enforce, at an actuation gate that denies actuation by default, fail-closed actuation by enabling actuation only after validating the scoped permit token and re-verifying, immediately prior to enabling actuation, by verifying a time-of-use inclusion proof under a time-of-use signed head satisfying the MMD freshness policy, that the receipt commitment is included under the time-of-use signed head.

25. The system of claim 24, further comprising an actuation gate for fail-closed control of the controlled effector, the actuation gate comprising: a gate interface configured to enable or disable actuation of the controlled effector, the gate interface having a default non-actuation state; token-validation logic configured to validate a scoped permit token including verifying at least a signature, an expiration, an anti-replay tuple, a token scope, and a revocation status; proof-verification logic configured to verify that a receipt commitment bound to the scoped permit token is included in an append-only continuity-verified log by verifying an inclusion proof under a signed head that satisfies a maximum merge delay (MMD) freshness policy and, upon reliance on a signed head that is newer than a previously observed signed head stored in a continuity record, verifying a consistency proof linking the previously observed signed head to the newer signed head; and control logic configured to perform a time-of-use check immediately prior to enabling actuation by requiring successful validation by the token-validation logic and successful verification by the proof-verification logic, and otherwise configured to deny actuation and output an SP-F record comprising a deterministic reason code and an evidence ref field.

26. The system of claim 25, wherein the actuation gate is implemented as at least one of firmware controlling a device latch, a secure enclave controller, a kernel module gating privileged system calls, a hypervisor gate controlling device assignment, or a network enforcement point gating account or transaction actions.

27. The system of claim 25, wherein the actuation gate comprises a plurality of cooperating enforcement points deployed at different layers including at least two of firmware, an operating system kernel, a hypervisor, a network enforcement point, or a service-side enforcement point, such that bypass of a first enforcement point does not enable actuation absent successful validation by the token-validation logic and successful verification by the proof-verification logic.

28. The system of claim 25, wherein the SP-F record comprises a reason_code selected from a deterministic reason-code registry and an evidence_ref field referencing at least one of a signed_head_id, an inclusion proof reference, a consistency proof reference, the receipt commitment, or a revocation reference.

29. The system of claim 25, further comprising anchoring a failure commitment derived from the SP-F record into the append-only continuity-verified log to make denial and hold events replay-verifiable.

30. A non-transitory computer-readable medium storing instructions that, when executed by one or more processors, cause the one or more processors to perform operations comprising: receiving an operation request associated with a controlled effector, the operation request including operation context data and references to one or more evidence bundles; deterministically canonicalizing at least a portion of the operation context data to produce a canonical context digest; obtaining one or more evidence bundles and computing cryptographic commitments to the one or more evidence bundles; evaluating, within an attested execution environment, machine-enforceable policy predicates of a versioned policy pack against the canonical context digest and the cryptographic commitments to the one or more evidence bundles subject to at least one freshness threshold;

generating a proof-of-policy-compliance (PoPC) receipt and deriving a receipt commitment from a Minimal ReceiptCore of the PoPC receipt; verifying inclusion of the receipt commitment in an append-only continuity-verified log under a signed head satisfying a maximum merge delay (MMD) freshness policy; storing the signed head as a previously observed signed head in a continuity record; upon reliance on a newer signed head than the previously observed signed head stored in the continuity record, verifying append-only evolution using a consistency proof; and minting, via a mint-after-verify (MAV) process, a scoped permit token only after (a) inclusion proof verification succeeds under a signed head satisfying the MMD freshness policy and (b) when relying on a signed head that is newer than the previously observed signed head stored in the continuity record, consistency proof verification succeeds, the scoped permit token being bound to at least the receipt commitment and a token scope for fail-closed actuation gating-; and enforcing, at an actuation gate configured to deny actuation by default, fail-closed actuation by enabling actuation of the controlled effector only after validating the scoped permit token and re-verifying, immediately prior to enabling actuation, by verifying a time-of-use inclusion proof under a time-of-use signed head satisfying the MMD freshness policy, that the receipt commitment is included under the time-of-use signed head, and otherwise denying actuation.

\* \* \* \* \*